United States Patent [19]

Szczutkowski et al.

[11] Patent Number: 4,817,146

[45] Date of Patent: Mar. 28, 1989

[54] CRYPTOGRAPHIC DIGITAL SIGNAL TRANSCEIVER METHOD AND APPARATUS

[75] Inventors: Craig F. Szczutkowski, Forest, Va.; Richard L. Zinser, Jr., Schenectady, N.Y.; Satish Kappagantula, Lynchburg; Eugene H. Peterson, III, Forest, both of Va.

[73] Assignee: General Electric Company, Lynchburg, Va.

[21] Appl. No.: 661,597

[22] Filed: Oct. 17, 1984

[51] Int. Cl.$^4$ .............................................. H04K 1/04
[52] U.S. Cl. ........................................ 380/48; 380/28; 380/49
[58] Field of Search .................... 370/118; 380/48, 28, 380/49

[56] References Cited

U.S. PATENT DOCUMENTS

| 3,697,682 | 10/1972 | Berg | 370/118 |
|---|---|---|---|
| 4,027,243 | 5/1977 | Stackhouse et al. | 375/114 |
| 4,322,576 | 3/1982 | Miller | 380/48 |
| 4,369,443 | 1/1983 | Giallanza et al. | 340/825.47 |
| 4,382,298 | 5/1983 | Evans | 371/6 |
| 4,434,323 | 2/1984 | Levine et al. | 380/48 |
| 4,455,649 | 6/1984 | Esteban et al. | 370/118 |
| 4,622,680 | 11/1986 | Zinser | 370/118 |
| 4,677,671 | 6/1987 | Galand et al. | 381/31 |
| 4,688,251 | 8/1987 | Citron et al. | 380/34 |

FOREIGN PATENT DOCUMENTS

| 0111612 | 11/1982 | European Pat. Off. |
| 0084125 | 7/1983 | European Pat. Off. |
| 2086106A | 5/1982 | United Kingdom |

OTHER PUBLICATIONS

Crochiere, R. E., Webber, S. A. and Flanagan, J. L., "Digital Coding of Speech in Subbands", *Bell Syst. Tech. J.*, 55 (Oct. 1976), 1069–1085.

Crochiere, R. E., "On the Design of Sub-Bands Coders for Low-Bit-Rate Speech Communication", *Bell Syst. Tech. J.*, 56 (May–Jun. 1977), 747–770.

Crochiere, R. E., "Digital Signal Processor–Sub-Band Coding", *Bell Syst. Tech. J.*, 60 (Sep. 1981), 1633–1653.

Esteban, D. and Galand, C., "Application of Quadrature Mirror Filters to Split Band Voice Coding Schemes", *Proc. 1977, Int. Conf. on Acoustics, Speech and Signal Processing*, Hartford, CT. (May 1977) 191–195.

Cummiskey, P., Jayant, N. S. and Flanagan, J. L., "Adaptive Quantization in Differential PCM Coding of Speech", *Bell Syst. Tech., J.*, 52 (Sep. 1973), 1105–1118.

Goodman, D. J., and Wilkinson, R. M., "A Robust Adaptive Quantizer", *IEEE Trans. Comm.*, COM-23 (Nov. 1975), 1362–1365.

Croisier, A., "Progress in PCM and Delta Modulation: Block Companded Coding of Speech Signals", 1974 Int. Zurich Seminar, Proceedings.

Jonston, J. D., "A Filter Family Designed for Use in Quadrature Mirror Filter Banks", *Proceedings 1980 Int. Conf. on Acoustics Speech and Signal Processing*, Denver, CO, Apr. 1977, 291–294.

Max J., "Quantizing for Minimum Distortion", *IRE Trans. Information Theory*, IT-6 (Mar. 1960), 7–12.

Jakes, W. C., "Microwave Mobile Communications", J. Wiley and Sons, New York, (1974).

(List continued on next page.)

*Primary Examiner*—Salvatore Cangialosi
*Attorney, Agent, or Firm*—Nixon & Vanderhye

[57] ABSTRACT

Hybrid subband coding and decoding (using different encloding/decoding algorithms in at least one subband channel) and subband time delay compensation at a point of maximum digital bandwidth compression are effected so as to reduce required DSP on-chip memory requirements. At the same time a special digital signal format is employed so as to provide enhanced data frame synchronization, enhanced cryptographic synchronization and selective signalling ability within a cryptographic digital signal transceiver. The ability to successfully accomplish late entry (or to re-establish synchronization once lost) into an ongoing received message is provided.

18 Claims, 13 Drawing Sheets

OTHER PUBLICATIONS

Boddie, J. R., et al., "Adaptive Differential Pulse-Code-Modulation Coding", *The Bell System Technical Journal,* vol. 60, No. 7, Sep. 1981, pp. 1547-1561.

Crochiere, R. E., et al, "A 9.6 Kb/s DSP Speech Coder", *The Bell System Technical Journal,* vol. 61, No. 9, Nov. 1982, pp. 2263-2288.

Smith M. J. T., et al., "A Procedure for Designing Exact Reconstruction Filter Banks for Tree-Structured Subband Coders", *Proceedings of the IEEE International Conference of Acoustics, Speech and Signal Processing,* Mar. 1984, vol. 2, pp. 27.1.1-27.1.4.

Barnwell, T. P., et al, "A Real Time Speech Subband Coder Using the TMS32010".

Fjallbrant, T., et al., "A Speech Signal ATC-System with Short Primary Blocklengths and Microprocessor-Based Implementation", ..., pp. 357-363.

Gupta et al, "A Cascaded Digital Signal Processor for Real-Time Speech Coding", *Proceedings of National Electronics Conference* 29-33 (1983).

Barnwell, "An Experimental Study of Sub-Band Coder Design Incorporating Recursive Quadrature Filters and Optimum ADPCM", *Proceedings of the IEEE International Conference on Acoustics, Speech and Signal Processing,* (1981).

Mitchell, "A Comparison of the Cryptographic Requirements for Digital Secure Speech Systems Operating at Different Bit Rates", *International Conference on Secure Communications Systems* (1984).

FUNCTIONAL BLOCK DIAGRAM OF ADPCM CODER/DECODER

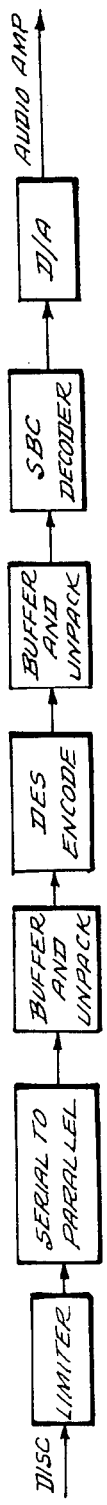
FIG. 5
TRANSMIT OPERATION
FIG. 6
RECEIVE OPERATION

SYSTEM FREQUENCY RESPONSE

SYNC ACQUISITION SUBROUTINE

SYNC MAINTENANCE SUBROUTINE

LATE ENTRY SUBROUTINE

CRYPTOGRAPHIC DIGITAL SIGNAL TRANSCEIVER METHOD AND APPARATUS

This invention relates generally to the field of electrical signal coding/decoding for transmission of cryptographically encoded digital signals over communication channels. More particularly, it relates to an improved type of subband coder/decoder wherein digitized signals are digitally encoded, transmitted over a communication channel and decoded so as to reconstruct the original analog or digital signals. When applied to digitized voice signals, this invention will find particular application in voice communication devices such as radios, telephones and the like. It may also be useful wherever digitized electrical signals of any type are to be band compressed to a lower bit rate for transmission over a limited bandwidth signal transmission channel. This application is related to the following commonly assigned copending application:

- Ser. No. 661,598 entitled "Hybrid Subband Coder/Decoder Method and Apparatus" by Zinser, filed concurrently herewith which issued on Nov. 11, 1986 as U.S. Pat. No. 4,622,680;
- Ser. No. 661,733 entitled "Method and Apparatus for transceiving Cryptographically Encoded Digital Data" by Szczutkowski et al, filed concurrently herewith; and
- Ser. No. 661,740 entitled "Method and Apparatus for Efficient Digital Time Delay Compensation in Compressed Bandwidth Signal Processing" by Szczutkowski and also filed concurrently herewith.

The disclosure of these related applications is hereby expressly incorporated by reference. Each of these related applications describes and claims a different aspect of the presently described invention which represents the combination of such different features into a common apparatus or method.

Subband coders of various types, as well as many types of quantized digital signal encoding/decoding algorithms, are well known in the art. For example, the art of subband coder design for a Rayleigh fading channel including discussion of adaptive pulse code modulation (APCM) and block companded pulse code modulation (BCPCM) are discussed in "A Robust 9.6 Kb/s Subband Coder Design for the Rayleigh Fading Channel" by Zinser, Silverstein and Anderson, Proceedings of the IEEE International Conference on Communications, May 1984, Volume 3, pp. 1163-1168. A collection of prior art publications relevant to subband coder design is contained in this paper and is reproduced below (items 1-10) together with additional possibly relevant prior art publications (11-15):

1. Crochiere, R. E., Webber, S. A. and Flanagan, J. L., "Ditigal Coding of Speech in Subbands", Bell Syst. Tech. J., 55 (Oct. 1976), 1069-1085.
2. Crochiere, R. E., "On the Design of Sub-band Coders for Low-Bit-Rate Speech Communication", Bell Syst. Tech. J., 56 (May-June 1977), 747-770.
3. Crochiere, R. E., "Digital Signal Processor: Subband Coding", Bell Syst. Tech. J., 60 (September 1981), 1633-1653.
4. Esteban, D. and Galand, C., "Application of Quadrature Mirror Filters to Split Band Voice Coding Schemes", Proc. 1977 Int. Conf. on Acoustics, Speech and Signal Processing, Hartford, CT (May 1977), 191-195.
5. Cummiskey, P., Jayant, N. S. and Flanagan, J. L., "Adaptive Quantization in Differential PCM Coding of Speech", Bell Syst. Tech. J., 52 (September 1973), 1105-1118.
6. Goodman, D. J. and Wilkinson, R. M., "A Robust Adaptive Quantizer", IEEE Trans. Communications, COM-23 (November 1975), 1362-1365.
7. Croisier, A., "Progress in PCM and Delta Modulation: Block Companded Coding of Speech Signals", 1974 Int. Zurich Seminar, Proceedings.
8. Jonston, J. D., "A Filter Family Designed for Use in Quadrature Mirror Filter Banks", Proceedings 1980 Int. Conf. on Acoustics Speech and Signal Processing, Denver, CO (April 1977), 291-294.
9. Max, J., "Quantizing for Minimum Distortion", IRE Trans. Information Theory, IT-6 (March 1960), 7-12.
10. Jakes, W. C., "Microwave Mobile Communications", J. Wiley and Sons, New York (1974).
11. Boddie, J. R., et al, "Adaptive Differential Pulse-Code-Modulation Coding", The Bell System Technical Journal, Volume 60, No. 7, September 1981, pp. 1547-1561.
12. Crochiere, R. E., et al, "A 9.6 Kb/s DSP Speech Coder", The Bell System Technial Journal, Volume 61, No. 9, November 1982, pp. 2263-2288.
13. Smith, M. J. T., et al, "A Procedure for Designing Exact Reconstruction Filter Banks for Tree-Structured Subband Coders", Proceedings of the IEEE International Conference on Acoustics, Speech and Signal Processing, March 1984, Volume 2, pp. 27.1.1-27.1.4.
14. Barnwell, T. P., et al, "A Real Time Speech Subband Coder Using the TMS32010", . . .
15. Fjallbrant, T., et al, "A Speech Signal ATC-system With Short Primary Blocklengths and Microprocessor-based Implementation", . . . , pp. 357-363.

In real time subband vocoder applications such as those generally described in the above prior art, there are at least two popular techniques for quantization and coding: (a) adaptive pulse code modulation (APCM) or the closely related adaptive differential pulse code modulation (ADPCM) and (b) block companded pulse code modulation (BCPCM). Both of these popular subband coding techniques are discussed in detail in the above-referenced Zinser et al paper which describes and compares a subband coder using the relatively high-complexity BCPCM encoding/decoding algorithm and a subband coder using the relatively low-complexity APCM encoding/decoding algorithm. This comparison reveals that an APCM subband coder gives lower subjective quality and less channel error tolerance than a BCPCM subband coder. As will be appreciated, the less complex APCM algorithm requires less memory to implement (e.g., in a digital signal processor) than does the more complex BCPCM algorithm.

As a result, it might be concluded that it would be preferable to use a BCPCM subband coder. However, the greater memory requirements for BCPCM algorithms have been discovered to exceed the available RAM capacity of some available digital signal processing (DSP) integrated circuits (e.g., the NEC 7720 integrated circuit which has only 128×16 bits of RAM).

Nevertheless, in accordance with the present invention, we have discovered that it is possible to use hybrid subband APCM/BCPCM algorithms to minimize required digital memory while still yielding 1 db or more improvement in the overall signal-to-noise ratio (and possibly better subjective voice quality) as compared to a conventional all APCM subband coder.

While in the past different encoding/decoding algorithms have sometimes been cascaded (e.g., see Crochiere et al "A 9.6-Kb/s DSP Speech Coder" which uses a time domain harmonic scaling algorithm prior to a subband coding algorithm which uses ADPCM in each subband), the use of different encoding/decoding algorithms in the various subbands of a subband coder is believed to be a novel technique. Within the context of a digital signal processor (DSP) integrated circuit implementation having limited digital memory capacity, such new hybrid subband coding techniques have been discovered to offer significant advantages.

For example, in the presently preferred exemplary embodiment, an audio signal bandwidth of 180 to 2900 Hz is divided into four octaves. Given that perhaps only one of those octave subbands can be handled with the more complex BCPCM algorithm, we have chosen the highest treble band (e.g, 1450–2900 Hz) as being the preferable subband for BCPCM coding. In the exemplary embodiment, so as to achieve a total output rate of 9,244 bits per second, this highest subband must be coded with no more than about 1⅜ bits per sample. Accordingly, in the exemplary embodiment, the real time digital signal processor implements BCPCM by encoding a 16-sample block with 16 sign bits and 5 bits of gain magnitude data. This results in an output rate of 21/16 or 1.3125 bits per sample. Furthermore, such a technique requires only two words of computer memory in a 16-bit architecture. Namely, one 16-bit FIFO buffer for the sign bits and one 16-bit buffer in which to accumulate the gain magnitude.

We have discovered that when such a hybrid subband coder is applied to typical voice signals, the hybrid scheme yields approximately one decibel better signal-to-noise ratio (e.g., 4 db vs. 3 db and perhaps even more) as when compared to a similar all APCM subband coder (e.g., one which uses 1⅜ bits per sample for the highest treble subband).

Subband coders using non-symmetrical quadrature mirror filter (QMF) filter trees are also well known in the art. For example, such a QMF filter tree used for separating digitized speech signals into four octave bands (and an inverse QMF tree for combining them back into one band at the receiver) in the context of a subband encoding/decoding technique is discussed in the above-referenced paper by Zinser et al.

As is well known in the art, non-symmetrical QMF filter trees are well suited for efficiently dividing a digitized input signal into subband channels of digital signals representing different frequency subbands of signal components. Such a QMF filter tree is particularly advantageous where programmed digital signal processors are employed to physically implement the signal processing algorithms.

It is also well known that because of the non-symmetrical tree structure of such a QMF filter bank, the various bands have different numbers of filter elements therewithin thus causing different filtering process times to be involved in the different subband channels. It is conventional practice to include compensating time delay in the various subband channels so as to keep the digital signals representing the different frequency components travelling in approximate time synchronism throughout the system. A formula for calculating the required magnitude of time delay compensation in each channel is expressly given in the above-referenced Zinser et al paper.

However, in prior art subband coded signal processing, such time delay compensation has been conventionally effected as a part of or immediately adjacent the QMF filtering function itself. When thus closely associated with the QMF filter tree, the digital memory required for time delay compensation can be rather large due to the relatively high bit rates involved.

Now, however, we have discovered that one may successfully perform the required time delay compensation upon bandwidth compressed encoded digital signals in the subband channels thereby greatly reducing the required memory for implementing such time delay compensation.

For example, on the transmitter side, time delay compensation is not introduced until after digital bandwidth compression takes place by a suitable encoding algorithm (e.g. adaptive pulse code modulation, adaptive differential pulse code modulation, block companded pulse code modulation, etc.). On the receiver side, similar required time delay compensation associated with the inverse QMF filter tree may be effected prior to the decoding step. (If desired, the total desired subband delay for any given channel may be effected totally at the transmitter side or totally at the receiver side or divided therebetween in any desired fashion.)

In the exemplary embodiment, there is an approximately 4.7:1 ratio between the number of bits per second passing through the system before encoding and after encoding. Accordingly, performing the required time delay compensation at points in the system where the signals are compressed to minimum bit rates can significantly minimize the digital memory required for implementing such time delays. In the exemplary embodiment, the conventionally required RAM (for implementing delay compensation as calculated in the Zinser et al paper) is 49 sixteen bit words whereas, using our invention, only 5 sixteen bit words of RAM are required.

The present invention includes a technique for efficient implementation of delay equalization in a subband coder/decoder (e.g. a multi-band data compression waveform encoder/decoder). It permits particularly efficient implementation (in terms of minimum digital memory requirements) of speech bandwidth compression algorithms. It may also, of course, be used to efficiently implement more generalized waveform encoder/decoder algorithms where digital signals are bandwidth compressed so as to require the transmission of fewer bits per second at some points in the system.

In particular, efficient realization of delay equalization is provided for filter elements (or for that matter any other elements) so as to bring the processed signal within the discrete subbands back into time synchronism with respect to one another before they are multiplexed and transmitted over a common communication channel and/or at least before they are decoded and recombined in proper time synchronism (i.e. "in phase"). Since some presently available DSPs (Digital Signal Processors) have only limited on-chip digital memory capacity, the more efficient time delay compensation technique of the present invention may permit all of the required signal processing functions to be implemented on a single DSP integrated circuit chip.

Transceiving digital control and message data signals over radio communication channels is also already well known in the art. For example, reference may be had to commonly-assigned U.S. Pat. No. 4,027,243 - Stackhouse et al which describes a form of digital message generator for a digitally controlled radio transmitter and receiver in a radio communication system. Provisions are made for acquiring bit synchronization as well as word synchronization (including the multiple transmission of address information in complemented and uncomplemented form) in each of a steady succession of digital command messages transmitted between radio station sites. A modem circuit capable of detecting a 2 out of 3 voted Barker code sync word for frame synchronization is included in the Stackhouse et al system.

Cryptographic encoding of digitized speech signals is also well known in the prior art. For example, the Data Encryption Standard (DES) utilized in the presently preferred exemplary embodiment of this invention is itself well known and more fully described in detail in the following printed publications:

"Federal Information Processing Standards" Publication No. 46, Data Encryption Standard, U.S. Department of Commerce, NTIS, 5285 Port Royal Road, Springfield, Virginia 22161;

"Federal Standard 1027 GSA, Telecommunications, General Security Requirements For Equipment Using DES" available from NTIS or the U.S. Government Printing Office; and "Federal Information Processing Standards Publication No. 81, DES Modes of Operation" (the "output feedback mode" is utilized in the presently preferred embodiment of this invention), also available from NTIS or the U.S. Government Printing Office.

Typically, as in DES, encoded digital voice signals are transmitted in blocks or "frames" of fixed size along with a progressively changing encryption "vector" which, when combined with appropriate secret "key" digital data, may be used to encode or decode digitized voice data (or any other type of digital data).

It is also known to provide automatic selective signalling within radio communication networks of various types. Sometimes a separate "control" channel is utilized for achieving the desired selective signalling functions (e.g. selection of available communication channels and selection of a desired subset of message recipients within the system).

However, for various reasons, in prior voice privacy systems utilizing digitized and cryptographically encoded voice data signals, truly automatic selective signalling capability is not believed to have been previously available. Nevertheless, it is highly desirable in many radio communication environments to have such selective signalling capability. For example, it may be very useful to selectively address one of plural repeaters that may be within range of a given transceiver which is generating or relaying such an encrypted digital voice message.

It is also believed highly desirable to permit late entry and/or synchronization recovery (both word and cryptographic synchronization recovery) in the context of a digital voice privacy radio communication system having true selective signalling capability.

As explained in Stackhouse et al, a radio frequency communication channel is a relatively noisy and sometimes unreliable environment. Impulse noise, multipath interference and signal fading are typical of the expected problems that must be successfully overcome.

The present invention utilizes a unique format of control and encoded voice digital signals which provides the above set forth desired features especially well in the context of a radio frequency communication channel. It follows, of course, that the same unique format is also advantageous for any other less onerous type of communication channel such as, for example, conventional telephone channels or wire lines (perhaps also using added conventional modems on each end of the channel).

These as well as other advantages, objects and features of the invention will be better appreciated by careful study of the following detailed description of the presently preferred exemplary embodiment of this invention in conjunction with the accompanying drawings, of which:

FIG. 5 is a general functional flow diagram of a transmit operation in the exemplary embodiment;

FIG. 6 is a flow diagram of an exemplary receive operation in the exemplary embodiment;

Figure 1:
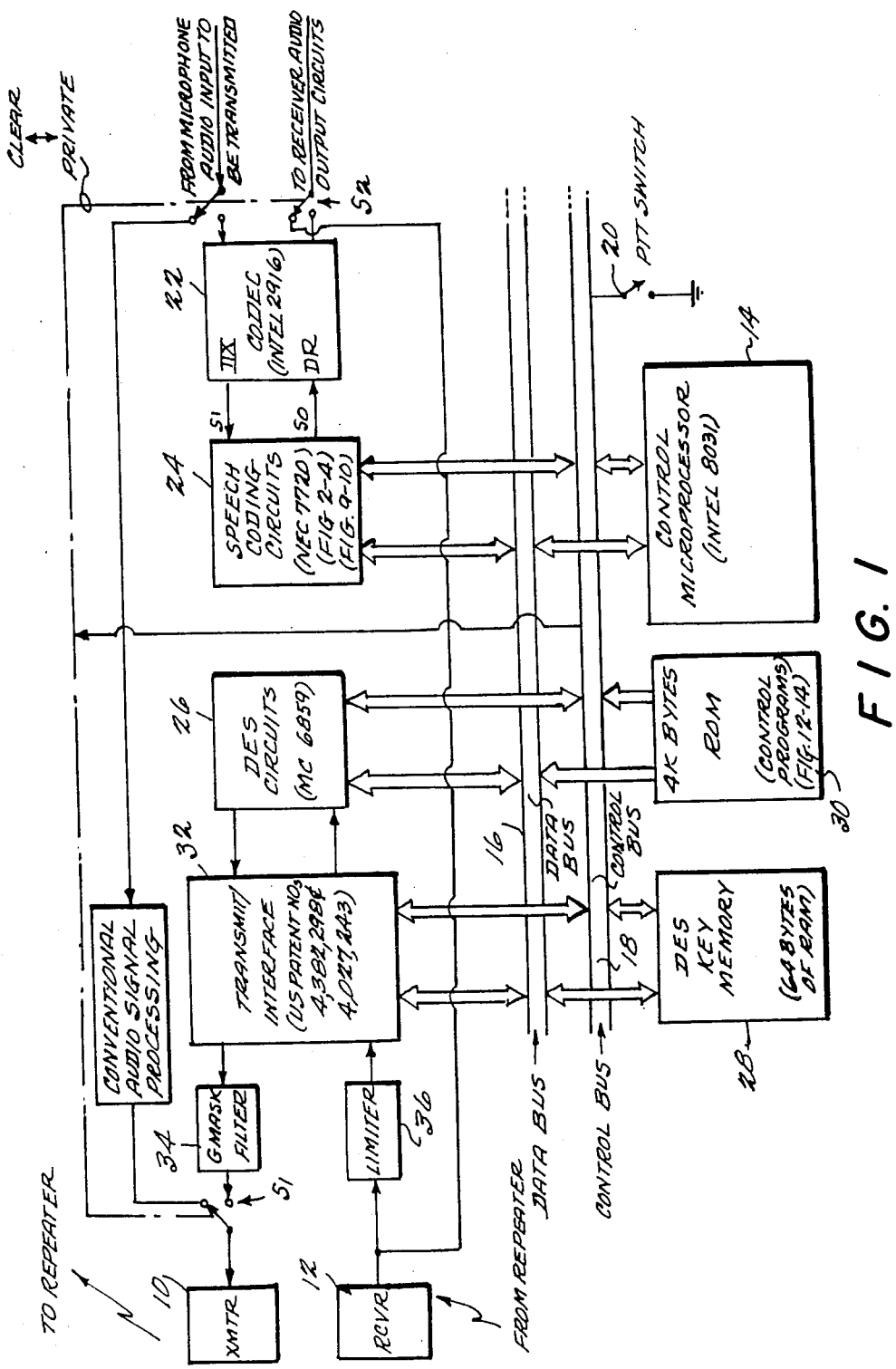
FIG. 1 is a schematic block diagram of the hardware and overall hardware architecture which may be utilized to implement this invention.
Figure 11:
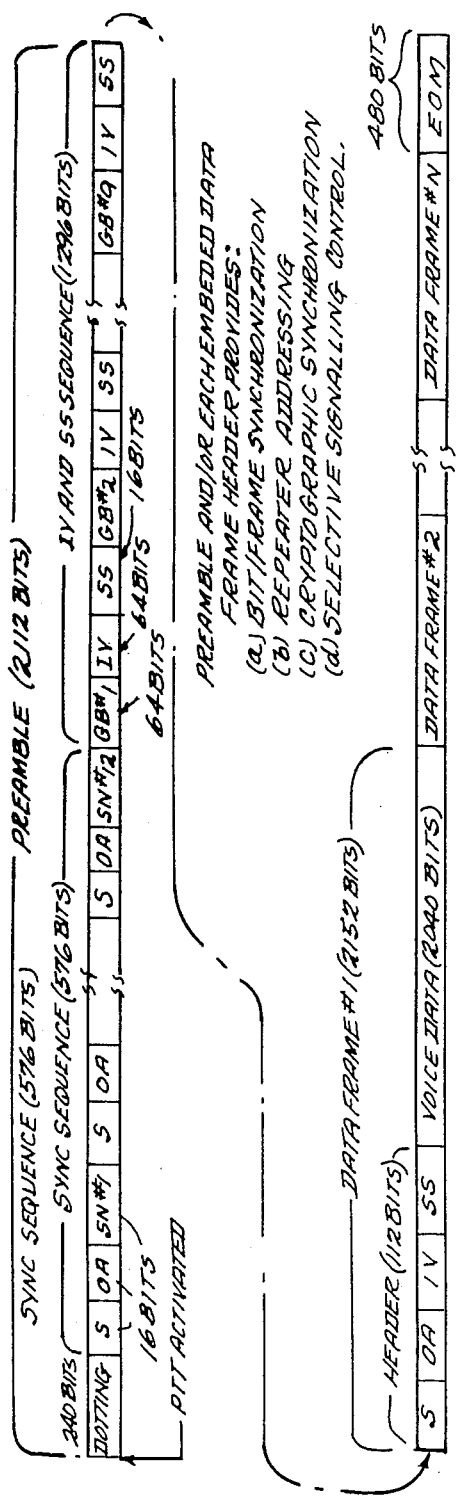
Figure 12:
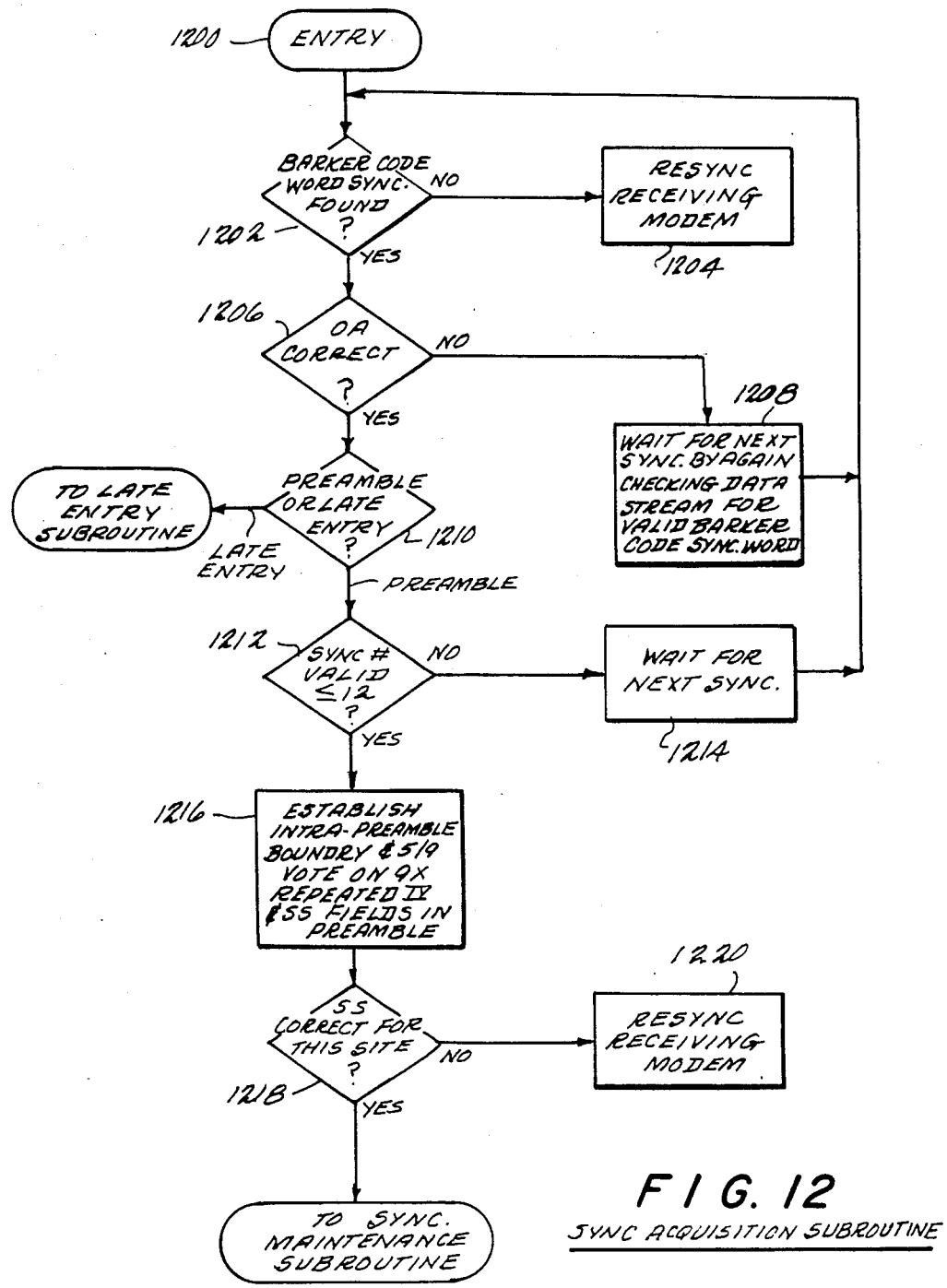
Figure 13:
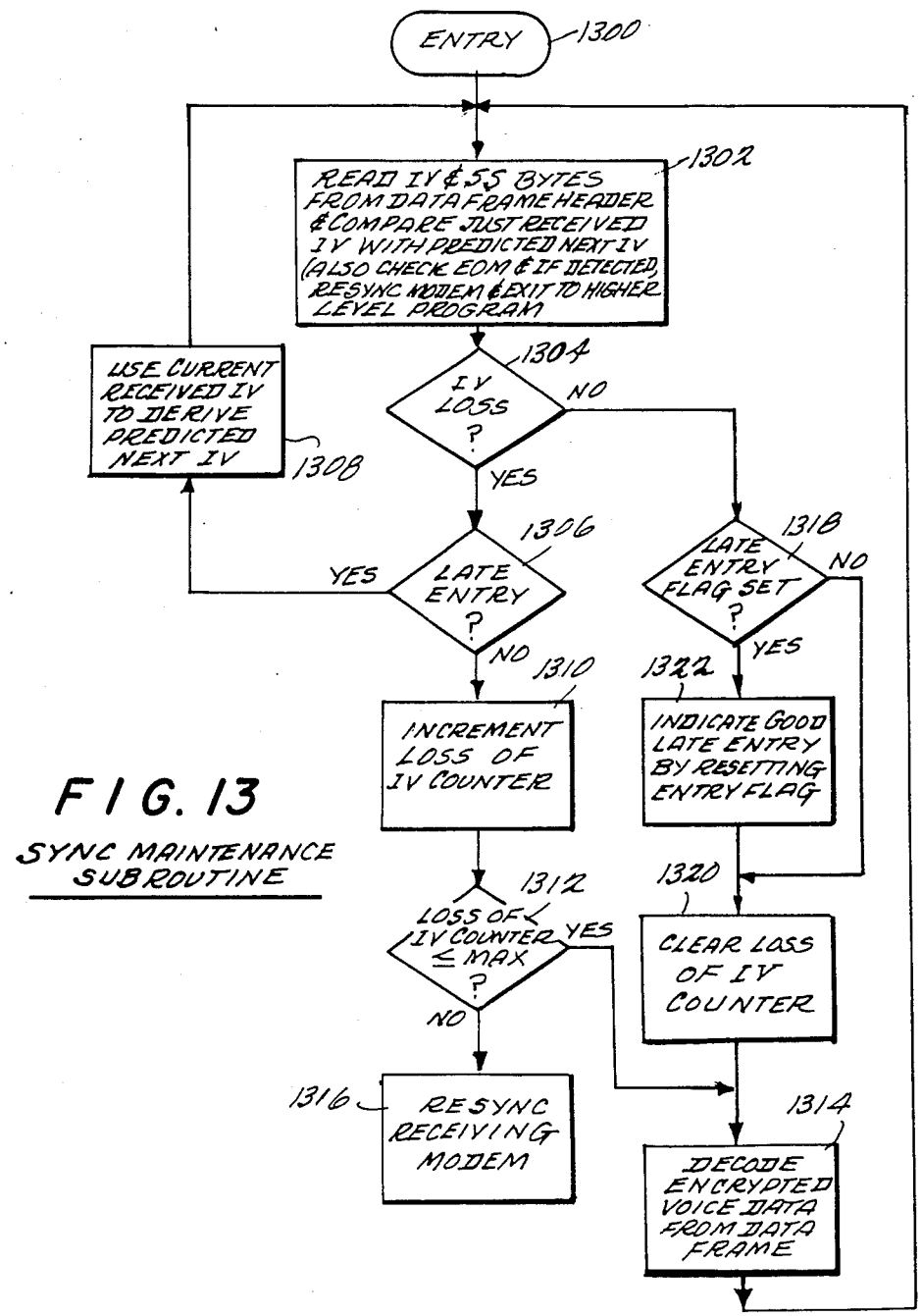
Figure 14:
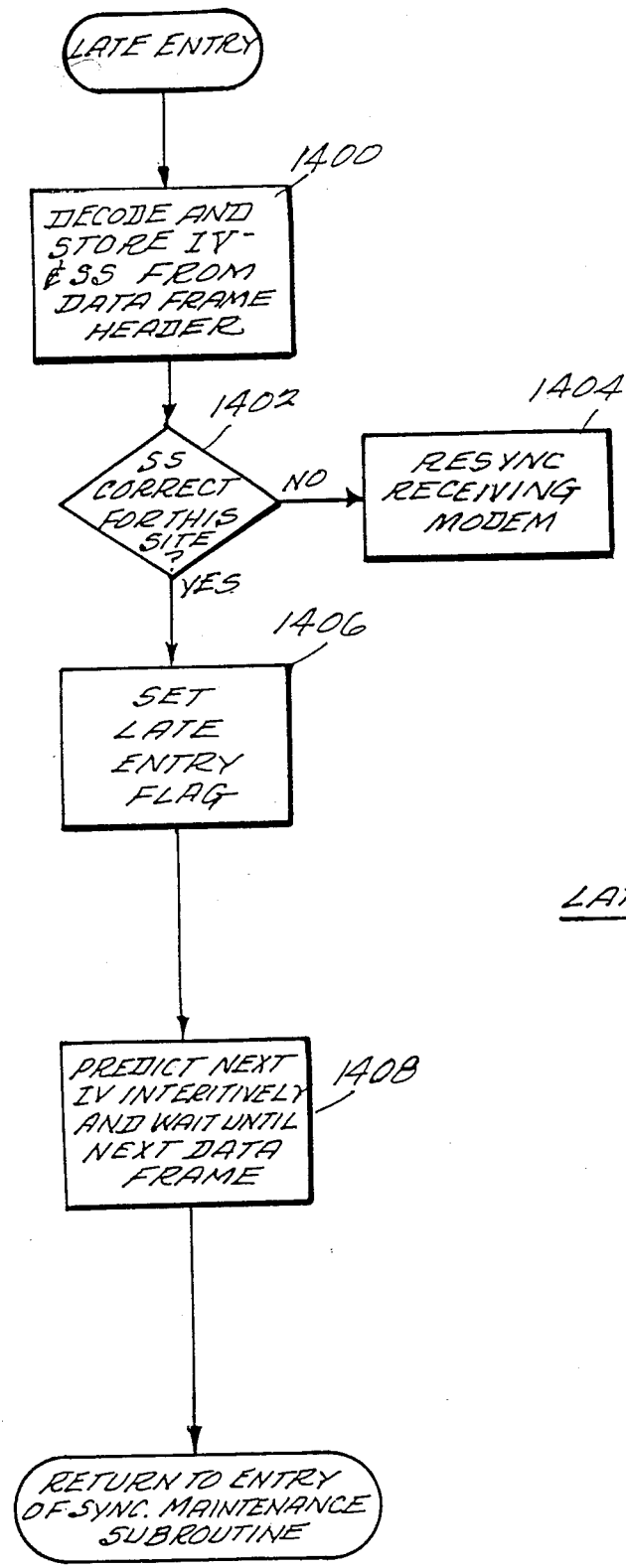

FIG. 11 is a schematic/graphic depiction of an exemplary preferred format or time sequence of the transmitted and/or received stream of digital signals in the exemplary embodiment of FIG. 1; and FIGS. 12-14 are simplified general flow block diagrams of exemplary computer programs that are embodied in the control program memory devices of the exemplary FIG. 1 system embodiment for the purposes of sync maintenance, acquisition and late entry.

The transceiver of FIG. 1 includes the usual radio frequency transmitter 10 and radio frequency receiver 12 (or any other communication channel transmitter and receiver such as, for example, the transmit lines and receive lines of a conventional wire line modem). As indicated in FIG. 1, the transceiver may be in communication with one or more repeaters or other transceivers or base station(s) over a radio frequency or other form of communication channel. The clear/private switches S1, S2 (typically realized as conventional solid state controlled MUX switches used to switch analog signals under control of digital switch signals) may be provided so that the transceiver can operate in a conventional "clear" mode or alternatively, in the cryptographic or "private" mode. For example, when the switches are in the "clear" mode as shown in FIG. 1, the audio input coming from a microphone and to be transmitted is simply directly connected to transmitter 10 while the output of receiver 12 is directly connected to the usual receiver audio output circuit.

However, when switches S1, S2 are moved to the "private" mode position, then the microprocessor controlled remainder of the FIG. 1 circuitry is switched into operation between the usual receiver audio input/output circuits and the usual radio frequency transmitter/receiver circuits 10, 12. In particular, the microprocessor controlled circuitry will take conventional audio input signals (e.g. from a microphone or audio amplifier or the like) and convert those to a stream of cryptographically encoded digital signals input at switch S1 to the modulator of transmitter 10. On the receiving side, a stream of digital signals arrives via the detector output of receiver 12 and is ultimately decoded and converted into analog audio signals at the lower contact of switch S2 before being passed onto the usual receiver audio output circuits (e.g. audio amplifiers, loudspeakers, etcetera).

In the preferred embodiment, the detector output of receiver 12 is constantly connected to the "private" digital decoding circuits (as shown in FIG. 1) so that the received signal can constantly be monitored. If a switch from "clear" to "private" mode is unexpectedly effected at the transmitter (e.g. initially or in the middle of an ongoing message), then the receiver "private" circuit will automatically begin the requisite decoding process and have decoded audio signals switched to the receiver audio output circuits automatically. This arrangement also takes it possible for the receiving set to automatically switch itself into the "private" mode wherever incoming digital signals are successfully decoded and in fact, this is contemplated for the preferred embodiment.

The overall architecture of the micro-processor control circuits shown in FIG. 1 is generally conventional. In particular, the heart of the system is a control microprocessor 14 (e.g. an Intel 8031 integrated circuit chip). Communication with the remainder of the digital circuitry is via the usual data bus 16 and control bus 18. The usual push-to-talk (PTT) switch 20 may be considered as one wire in the control bus 18 if desired. A manual clear/private mode switch used for selecting the mode of transmitted voice may also be one wire in the control bus 18 if desired. As should be appreciated, there is no need for a manual receive clear/private mode switch when automatic receive mode switching is performed as explained above. The system may include a conventional codec 22 (e.g. an Intel 2916 integrated circuit chip) and conventional speech coding circuits 24 in the form of a suitably programmed Digital Signal Processor (DSP) (e.g. an NEC 7720 integrated circuit chip) for converting audio signals to/from digital-analog form in accordance with known speech digitization and processing algorithms.

In the preferred exemplary embodiment, a hybrid subband coding technique is employed in accordance with the invention claimed in the related Zinser application. There the audio frequency band 180-2900 Hz is split into four octaves with the highest frequency band 1450-2900 Hz being subject to conventional block companded pulse code modulation (BCPCM) and the lower three subbands being subject to conventional adaptive pulse code modulation (APCM) digital bandwidth compression techniques. This plus the novel time delay compensation technique of Szczutkowski permit the speech coding to be carried out using but a single DSP chip 24.

The Data Encryption Standard is implemented via conventional DES circuits 26 (e.g. an MC 6859 integrated circuit chip) and a conventional DES key memory 28 (e.g. 64 bytes of RAM). Suitable conventional ROM circuits 30 (e.g. 4 kilobytes) are also provided to physically embody the program control structure pertinent to the present invention as indicated in FIG. 1.

The transmit/receive interface circuits 32 are sometimes referred to as "modem" circuits and may also be of conventional design. They preferably include bit restoration circuits of the type described in commonly assigned U.S. Pat. No. 4,382,298-Evans. Although conventional clock recovery and up/down counter circuits can be employed with this invention, it is presently preferred to use the clock recovery circuits described in the copending commonly assigned Evans application Ser. No. 527,471 filed Aug. 29, 1983 and the up/down counter circuits described in the copending commonly assigned Evans application Ser. No. 527,470 filed Aug. 29, 1983. Reference may also be had to the commonly assigned U.S. Pat. No. 4,027,243 - Stackhouse et al for digital transmit/receive modem interface circuits suitable for use with radio frequency transmitters and receivers such as transmitter 10 and receiver 12 and for a hardwired Barker code sync word detector. In the preferred exemplary embodiment, the interface 32 may be placed in a "sync search" mode whereupon such a Barker code sync word detector is activated and which thereupon outputs a priority interrupt signal to control microprocessor 14 whenever such a sync word is detected.

A conventional Gaussian Minimum Shift Key (GMSK) filter 34 (e.g. a fourth order low pass Bessel filter having an about 7 kilohertz cut-off measured at the 3 dB points) is preferably included to process the stream of digital output signals before they are passed onto the modulator of transmitter 10 as should be appreciated by those in the art.

The output of receiver 12 (e.g. from an fm discriminator) is also preferably passed through a conventional limiter circuit 36 to eliminate d.c. bias effects that otherwise might be present in the output of the receiver discriminator. For example, the limiter 36 may utilize a simple comparator to compare the instantaneous incoming signal from receiver 12 with a running averaged value over some previous relatively short interval as should also be appreciated by those in the art.

The transmit/receive interface 32 may, for example, on the transmit side comprise a conventional parallel-to-serial shift register for generating a serial stream of digital binary signals to be transmitted. On the receive side, the transmit/receive interface 32 may typically utilize a digital phase locked loop for achieving bit synchronization and a hardwired correlator for recognizing a predetermined Barker code which may be used for achieving word synchronization.

The data format used in the preferred embodiment is set forth in the above-referenced related Szczutkowski et al application invention. Similarly, the time delay compensation used in conjunction with QMF banks is preferably inserted after the coding step (during transmission) and prior to the decoding step (during reception) as explained in the above-referenced related Szczutkowski application. This minimizes the memory required for implementing such time delays and is thus useful in permitting implementation using but a single DSP with limited memory capacity.

Those skilled in the art will understand that modern DSP circuits are now available which may be appropriately programmed (e.g., microcoded) so as to implement desired filtering and time delay functions as well as encoding/decoding algorithms (e.g., ADPCM/BCPCM), multiplexing, demultiplexing, etc., functions. Indeed, in the presently preferred exemplary embodiment, an NEC 7720 digital signal processor (DSP) 24 in FIG. 1 is so programmed. However, to better understand the functional significance of the various digital signal processing steps and to thus faciliate their implementation through proper programming, it is common to utilize functional block diagrams of the type depicted in FIGS. 2-4 and 8-10. Once the necessary functions have thus been defined in functional block diagram form, those skilled in this art will readily understand how to program an appropriate digital signal processor (DSP) to implement those functions which, within any given block, are conventional and well known digital signal processing functions.

The use of a hybrid subband encoding/decoding algorithm is a major reason why the speech coding can, if desired, be accomplished on a single DSP integrated circuit chip having limited memory capacity (e.g., the NEC 7720). In addition, to further conserve the use of memory, the presently preferred exemplary embodiment implements the necessary time delay compensation after the encoding step (in the transmitter function) and before the decoding function (in the receiver function). This is the subject of the above-referenced related invention of Szczutkowski. By performing the required time delay compensation between the coder/decoder functions where the signals are most tightly compressed (e.g., where the fewest number of bits per second pass), the memory required to implement the time delay compensation is minimized as should now be appreciated.

There are, of course, other digital signal processors having less severe memory constraints which might alternatively be used to practice the present invention of hybrid subband encoding/decoding. It may be implemented, for example, using a main frame processor as the system signal processor. And plural DSP chips could also be utilized to achieve the hybrid subband coding of this invention. Thus, in situations where memory constraints are less critical but where, perhaps, some other equivalent constraint exists (e.g., a limited bandwidth communication channel), the use of hybrid subband coding/decoding techniques in accordance with the present invention can be utilized to provide significantly improved signal-to-noise ratio and/or other benefits.

In these latter instances, the improved time delay compensation scheme of Szczutkowski may not be required or even desired.

Figure 2:
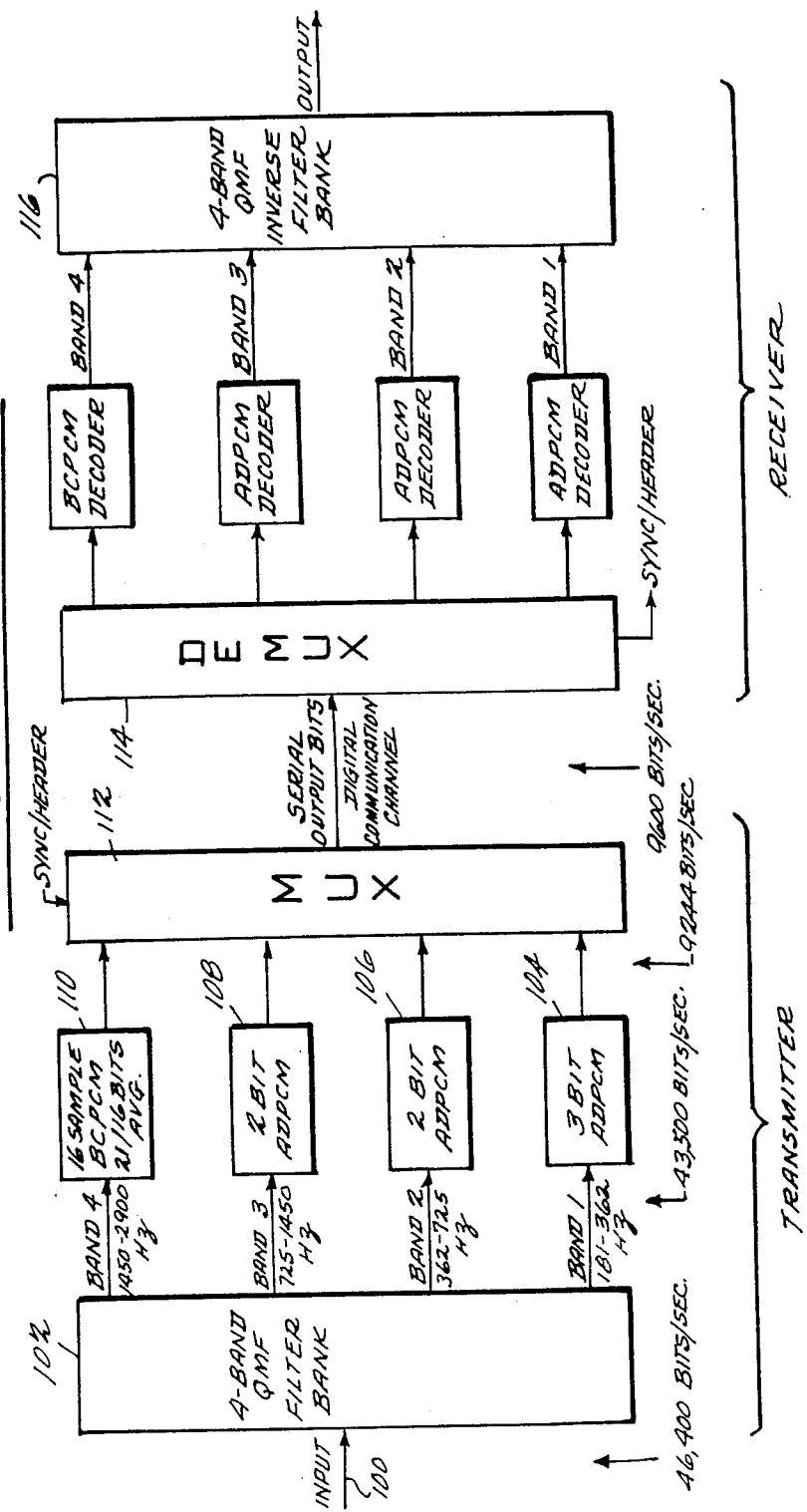
FIG. 2 is a functional block diagram of an exemplary hybrid subband coder in accordance with this invention of the type which may be implemented by the digital signal processing or "speech coding circuits" shown in FIG. 1.

In the functional block diagram of FIG. 2, the input signal at 100 is already a digitized version of an input analog audio signal. For example, it may be a serial bit string coming from codec 22 in FIG. 1 into an input buffer register of the DSP 24 of FIG. 1. The signal present at input 100 will typically represent an input electrical signal having a frequency band of components (e.g., from about 180 to 2900 Hz).

Well known quadrature mirror filter (QMF) banks (e.g., the conventional non-symmetrical tree structure which simplifies and/or minimizes computational requirements for real time applications such as this) are utilized in the four-band QMF bank 102 of FIG. 2. The QMF filters separate the input signal into plural channels of digital signals representing audio signal components in different subbands of frequency range. For example, as depicted in FIG. 2, bands 1-4 represent a four-octave division of the 180-2900 Hz input bandwidth.

Typically, a well known QMF tree structure is utilized with $h_e$ and $h_o$ filter pairs being utilized in a non-symmetrical tree structure to separate the incoming digital signal into octavely related bands. Each filter pair basically comprises a tapped digital delay line. The first filter pair may, for example, provide the highest frequency band 4 and a input to a second filter pair. The output of the second filter pair then provides band 3 and an input to a third filter pair which, in turn, provides band 2 and an input to yet a fourth pair of filters which, finally, produces band 1 output (the second output of the fourth filter pair is simply not used).

As will thus be noticed, bands 2, 3 and 4 have fewer filter elements contained in their signal path and therefore suitable time delay must be added in each such band so as to maintain time synchronization in the propagation of corresponding signal components in the different bands throughout the system. As will be appreciated, the necessary time delay compensation can be accomplished either at the transmit side or the receive side or divided as desired between both the transmit and receive sides. For example, if the four QMF filter pairs employed are 32, 16, 16, 16 point filters, then the corresponding time delay compensation for bands 4, 3 and 2 would be 49, 21 and 7 filter processing times, respectively. The exact value of the required time delay compensation depends upon the number of points used in each filter pair. For example, if 32, 16, 12, 8 point filter pairs are used, then the required time delay units would be 28, 11 and 3 for bands 4, 3 and 2, respectively. The general considerations and a formula for calculating such time delay compensation is set forth in the related and above-referenced Zinser et al paper.

Although such time delay compensation is conventionally performed immediately after QMF filtering, if it is desired to maximize conservation of digital memory requirements in the digital signal processor 24, then such time delay compensation may be made after the further bandwidth compression ADPCM/BCPCM encoding steps in accordance with the Szczutkowski invention as previously mentioned.

As also shown in FIG. 2, the band 1 output of the QMF filter bank 102 is passed to a conventional 3-bit ADPCM encoder 104. The band 2 output is processed by a conventional 2-bit ADPCM encoder 106. The band output 3 from the QMF filter 102 is processed by a conventional 2-bit ADPCM encoder 108. However, the band 4 output from the QMF filter 102 passes to a BCPCM encoder 110 thus making the subband coder of a hybrid ADPCM/BCPCM type. As will be explained more fully below, APCM is merely a special case of ADPCM and, accordingly, either technique may be employed in the coders 104, 106 and 108.

The multiplexing function 112 depicted in FIG. 2 takes the serial bit strings coming from encoders 104, 106, 108 and 110 and converts them into a single serial output bit string for passage along a digital communication channel. Typically, the multiplexing function 112 is implemented in the DSP 24 by simply buffering the serial outputs from the encoding processes 104-110 and then packing them in a predetermined order for output as a single serial bit string.

Although not depicted in FIG. 2, if encryption of the transmitted bit string is desired, then the serial bit string from multiplexing function 112 passes to the DES circuits 26 for encoding in accordance with the DES encryption algorithm after which the resulting encoded data bytes are buffered and packed and then converted from bit-parallel to bit-serial form before being output through filter 34 to the transmitter modulator. This entire overall transmit operation from microphone to modulator is functionally depicted at FIG. 5.

Whether DES encrypted or not, the receiver portion shown in FIG. 2 will eventually be the recipient of a serial string of bits similar to those originally generated by the multiplex function 112. For example, as depicted in FIG. 6, the incoming bit-serial string from the receiver discriminator typically passes through limiter 36 and then is converted from bit-serial to bit-parallel form before it is buffered, unpacked and processed conventionally by the DES circuits 26 so as to decrypt the incoming data and provide a decrypted serial string of bits to be buffered and unpacked (i.e., demultiplexed as indicated by function 114 in FIG. 2) so as to produce an appropriate bit-serial string for each of the bands 1 through 4 to be decoded.

Bands 1 through 3 are, of course, decoded in accordance with a conventional ADPCM decoding algorithm while band 4 is decoded with a conventional BCPCM decoding algorithm as depicted in FIG. 2. The resulting four strings of bit-serial decoded signals for bands 1-4 then pass through a conventional four-band QMF inverse filter bank 116 where they are combined into a single bit-serial output string. Finally, as depicted in FIG. 6, the bit-serial output of the subband decoder passes through a conventional digital-to-analog converter (e.g., codec 22) to produce an audio analog signal suitable for processing by conventional receiver audio output circuits.

Figure 3:
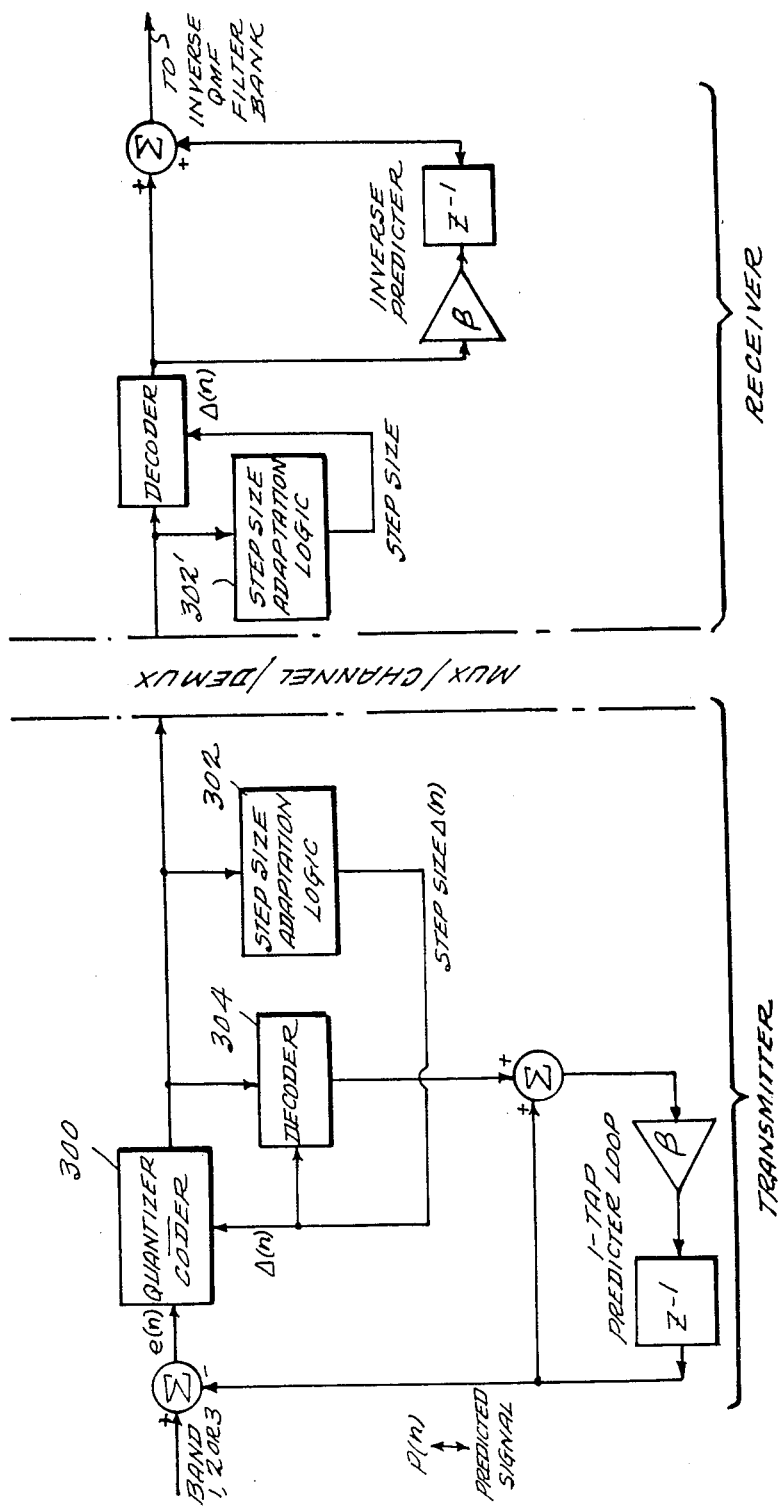
FIG. 3 is a functional block diagram of an exemplary ADPCM coder/decoder of the type depicted in FIG. 2 and which can also be implemented by proper programming of a digital signal processor (DSP) such as that shown in FIG. 1.
Figure 4:
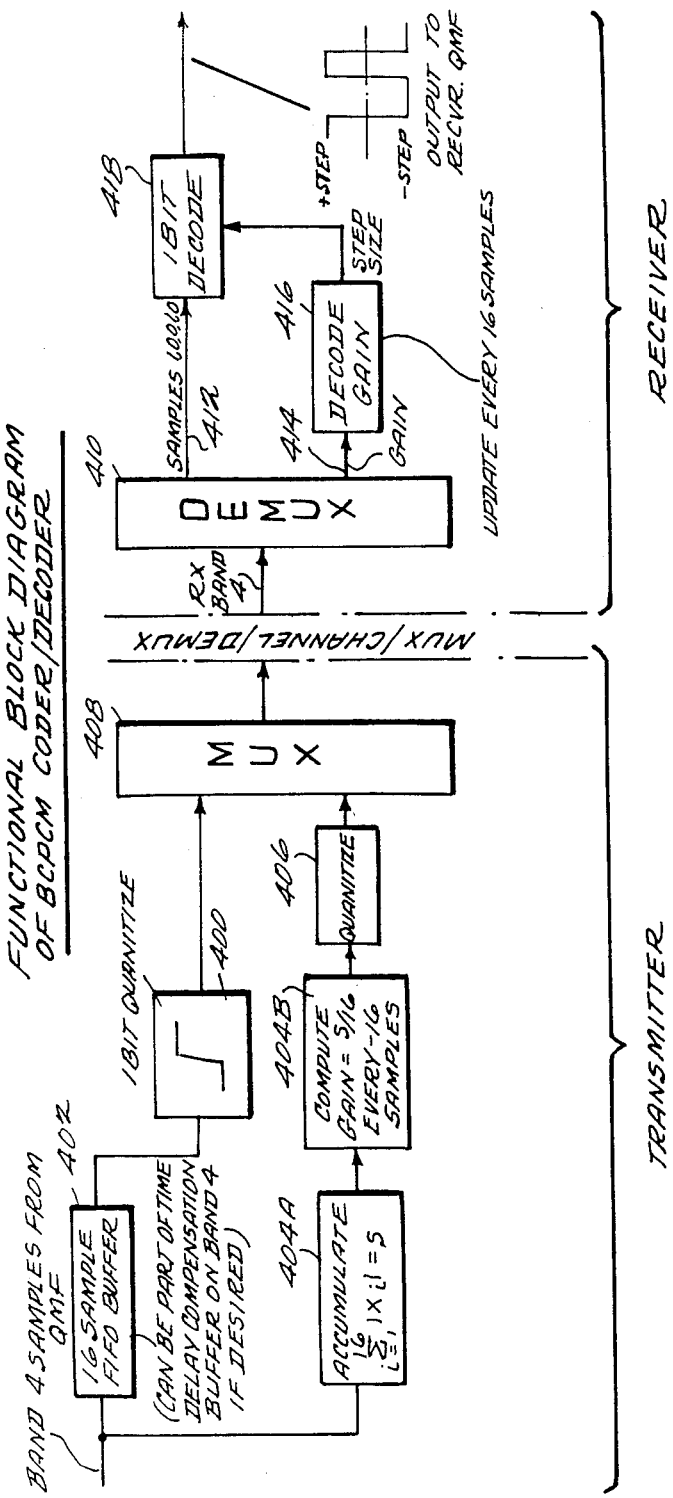
FIG. 4 is a functional block diagram of an exemplary BCPCM coder/decoder of the type generally depicted in FIG. 2 and which may also be implemented by properly programming the digital signal processor (DSP) circuits of FIG. 1.

Although the ADPCM and BCPCM encoding/decoding functions are conventional and well known in and of themselves (as is their straightforward implementation on programmable digital signal processors), these functions have been again depicted for easy reference at FIGS. 3 and 4.

For example, FIG. 3 depicts a typical functional diagram of an ADPCM coder/decoder. If the digital output of quantizer/coder 300 is at the outer levels of its present range, then the step size adaptation logic 302 detects this fact and increases the step size used by the quantizer 300. On the other hand, if the quantizer 300 is detected as outputting only in the inner levels of the current range, then the step size is decreased. If only the quantizer 300 and the step size adaptation logic 302 are utilized, then the device is actually an APCM coder. The addition of the decoder 304 and the rest of the 1-tap predictor loop depicted in FIG. 3 (including the summation nodes) makes the coder an adaptive differential PCM coder. As should be appreciated, if the gain factor is made to equal zero, the ADPCM coder again becomes an APCM coder. As used in this application, the terms APCM and ADPCM are considered as being synonymous.

The step size adaptation logic 302' in the receiver of FIG. 3 uses essentially the same logic based on the ongoing bit string values as does the logic 302 in the transmitter. However, because transmission errors occurring in the channel may cause incorrect adaptation in the receiver, an exponential decay factor is preferably used in both the transmitter logic 302 and the receiver logic 302' so as to damp out any such errors. More detail on the exponential decay feature may be had by reading the related above-referenced Zinser et al paper. In brief, the adaptation equation used by logic 302 and 302' may be of the following form:

$$d(n) = 0.98[d(n-1)] + m[I(n)] \qquad \text{(Equation 1)}$$

where
  d(n) is step size table pointer
  I(n) is quantizer level
  m[I(n)] is step size pointer update as a function of level.

The variable d(n) is typically constrained to be between the values 1 and 64. The step size [Δ(n)] at time n is found by using the integer value of d(n) as an index to a look up table. The look up table contains 64 exponentially spaced step sizes that span the desired dynamic range of the system.

A typical m[I(n)] table for a 3-bit quantizer is:

TABLE 1

| I(n) | M | |
|---|---|---|
| 1 | 8 | − numbers |
| 2 | 0 | |
| 3 | 0 | |
| 4 | −3 | |
| | | zero level |
| 5 | −3 | + numbers |
| 6 | 0 | |
| 7 | 0 | |
| 8 | 8 | |

(More information can be found on this technique in Boddie, Ref. 11.)

Once again, if the inverse predictor loop is simply omitted, one is left with APCM decoder. With it in place, one has a ADPCM decoder as should be apparent to those in the art.

A typical functional block diagram for a BCPCM coder/decoder is set forth at FIG. 4. Here, the band 4 samples from the QMF filter are quantized at 400 to produce a simple serial bit string where each bit in the string represents either a plus or a minus sign directed step. The size of the step used for each block of 16 samples is derived by computing the average absolute value of those 16 samples via functions 404A and 404B. FIFO buffer 402 holds the 16 samples during the gain computation process; it ensures that the encoded samples and gain are received in synchrony at the receiver. This buffer register may also be used as a part of the time delay compensation buffer for band 4. The result of the gain computation is then quantized at 406 (e.g., using 4 or 5 bits or the like) and then multiplexed at 408 so as to produce a bit-serial string for output to the frame multiplexer 112 shown in FIG. 2.

After passage through the channel and the demultiplexer 114, the band 4 signals are demultiplexed at 410 into string of serial sign bits at 412 and a multibit quantized gain signal at 414 which is decoded at 416 to set the desired step size within decoder function 418. As indicated in FIG. 4, increments using the decoded step size will be successively added and/or subtracted as successive sign bits are decoded at 418 so as to provide an output to the receiver QMF inverse filter bank 116 as shown in FIG. 2.

As will be appreciated by those in the art, the effective sampling for each band should be equal to the Nyquist frequency for the highest frequency component within that band. The resulting data rates will be a function not only of the sampling rate but also of the number of bits used to represent each sample of the voice signal. For example, using an approximately 5800 Hz overall sampling rate, the following Table 2 illustrates one possible exemplary arrangement for achieving an overall data rate of 9600 bits per second over the communication channel. The bandwidth compression achieved at each successive point in the functional diagram of FIG. 2 shows the type of overall bandwidth compression that may be achieved using hybrid subband coding.

TABLE 2

| Band (Hz) | Sample Rate (Hz) | Bits/ Sample | Bits/Sec |
|---|---|---|---|
| 181–362.5 | 362.5 | 3 | 1086 |
| 362.5–725 | 725 | 2 | 1450 |
| 725–1450 | 1450 | 2 | 2900 |
| 1450–2900 | 2900 | 1.3125 | 3806 |
| | | Total SBC | 9244 |
| | | Frame Sync & Header | 356 |
| | | Data Rate | 9600 |

As will be appreciated, synchronization signals and perhaps other "overhead" information is typically also multiplexed into the transmitted serial stream and allowances are thus made for same in Table 2.

Figure 7:
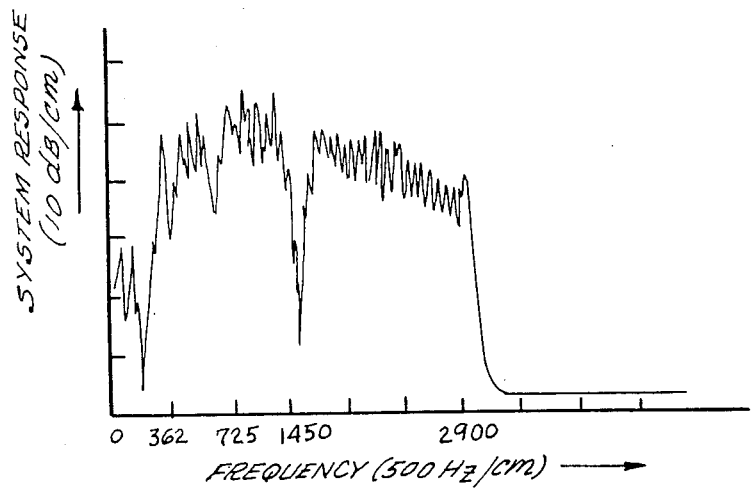
FIG. 7 is a graph depicting the non-overlapping subbands utilized in the preferred exemplary embodiment so as to minimize distortion otherwise caused by the relatively coarse quantization steps necessarily utilized in the exemplary embodiment ADPCM/BCPCM hybrid subband coder/decoder.

Because relatively coarse quantizing steps are utilized in this exemplary embodiment, it is believed preferable that the subbands do not actually overlap. Accordingly, the juncture between the subbands will actually lie on a depression in the overall frequency response characteristic of the entire system. For example, as shown in FIG. 7, the juncture between the subbands within the overall frequency response of the system may occur at points that are a number of decibels below the peak in-band bandpass levels.

Figure 8:
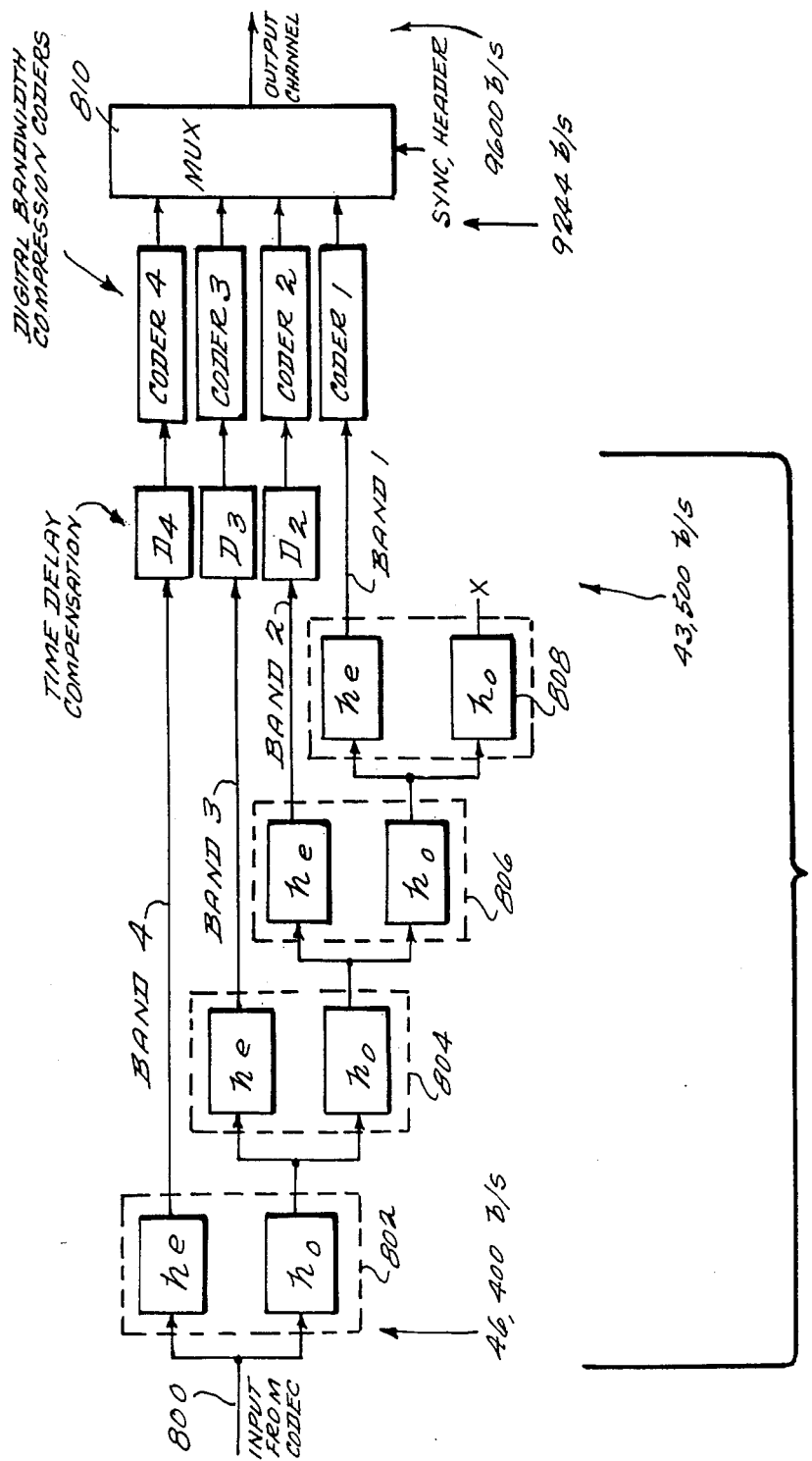
FIG. 8 is a functional block diagram of a typical prior art time delay compensation process.

As noted above, a number of subband coder/decoder implementations using programmed digital signal processors have already been discussed in the prior art. However, those which use a non-symmetrical QMF tree structure appear to always provide time delay compensation directly time-adjacent to the QMF functions as depicted in FIG. 8. Here, a time-sampled input signal at 800 is divided into multiple subband digital signals on bands 1, 2, 3 and 4 where the digital signals at each band represent a particular frequency band of the original signal. Thus, the frequency spectrum of the original input waveform (e.g. an analog audio signal input to a Codec giving rise to a digitized serial bit stream at input 800) is divided into four subbands using four conventional quadrature mirror filter pairs 802, 804, 806 and 808. A simplified depiction of the QMF filter pair functions is provided in FIG. 8 since they are already well known in the art.

In accordance with prior art techniques, each subband channel of digital signals is encoded using some technique which provides bandwidth reduction. For example, adaptive differential pulse code modulation (ADPCM) or simply adaptive pulse code modulation (APCM) or block companded pulse code modulation (BCPCM), etc. Digital bandwidth compression coders 1–4 are depicted in FIG. 8 as processing the respective subband channels 1–4 before the compressed digital signals are multiplexed (e.g. buffered and packed in a given sequence) at 110 to provide a bit serial string of digital signals representing discrete time segments of the original waveform. As schematically indicated at FIG. 8, appropriate synchronization and other header or "overhead" bits are typically also multiplexed into and passed over the output channel.

Superimposed on FIG. 8 are typical representative bit rates that may be involved at different points in the circuit. For example, there might be on the order of 46,400 bits per second present at the input 800 while the combined QMF filter outputs on all four subbands may equal approximately 43,500 bits per second. It will be noted that a significant 4.7:1 reduction in the bit rate occurs after the coders where four subband channels now comprise a total of 9,244 bits per second. Once additional sync and header bits and the like are added, the output channel may typically comprise 9,600 bits per second.

In any event, it will be noted that if time delay compensation is effected before bandwidth compression, significantly more bits will have to be stored over the desired time delay so as to achieve that desired time delay compensation in the various subband channels.

Figure 9:
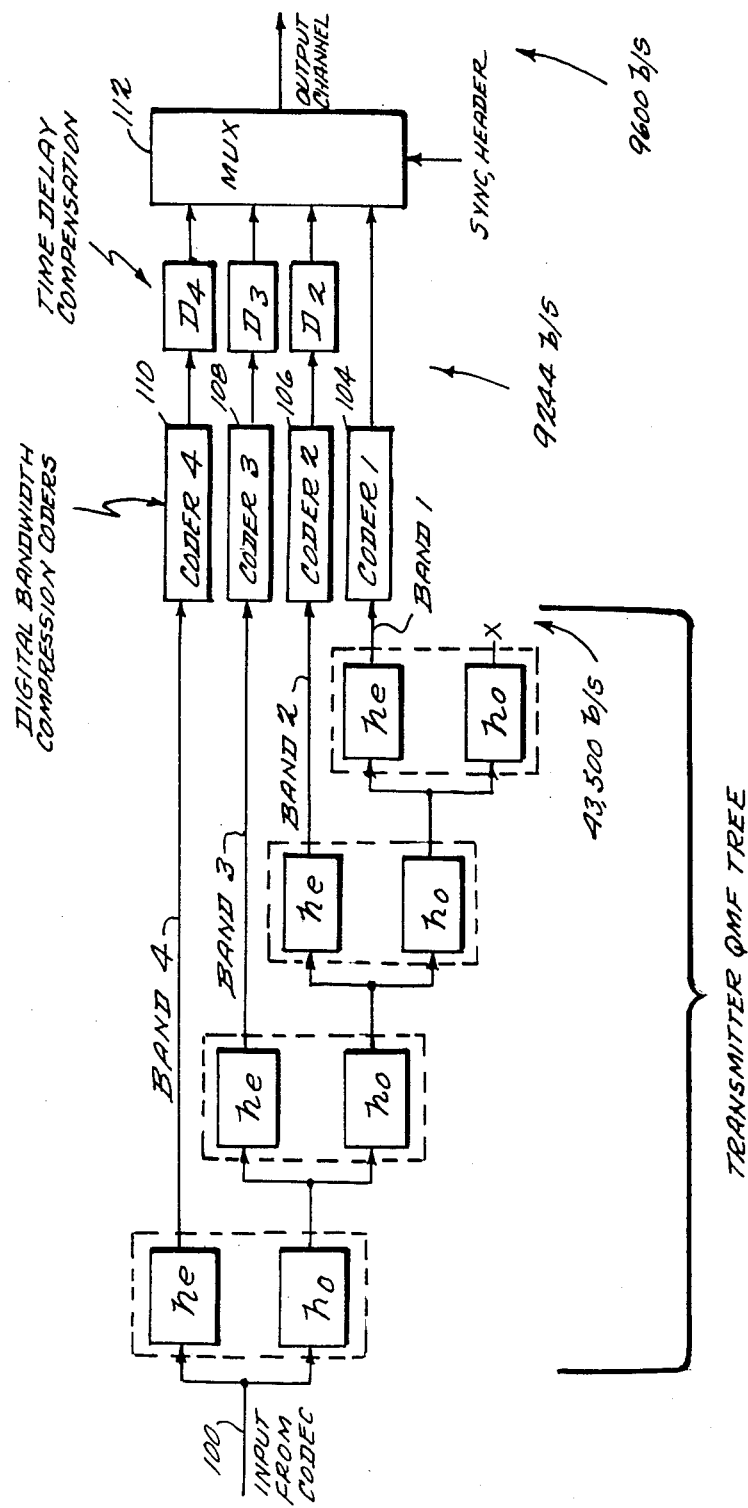
FIG. 9 is a functional block diagram of a time delay compensation process in a subband transmitter encoder in accordance with this invention.

On the other hand, if time delay compensation is provided after digital bandwidth compression by coders 2–4 (no time delay compensation is actually needed in subband 1 as it is already delayed more than the other subbands due to the extra filtering functions therein) as depicted in FIG. 9, then significantly fewer bits need be stored for the requisite time delays. In particular, in the exemplary embodiment, an improvement of approximately 10.4:1 in memory requirements can be obtained by performing time delay compensation on the digitally bandwidth compressed information flow rather than otherwise (as was conventional and as depicted in FIG. 8). For example, using the Zinser et al formula for calculating required subband delays, conventional practice in the exemplary embodiment would typically require use of $33+13+3=49$ sixteen bit words of RAM on the DSP integrated circuit chip. However the present invention requires only $[33(21/16)+13(2)+3(2)]/16=4.7$ sixteen bit words of RAM to realize the same needed time delays. This is a most significant 10.4 to 1 reduction in on-chip DSP delay memory requirements which can then be advantageously employed for other needed DSP functions.

For proper reconstruction of the original signal at the receiver (see functional diagram of FIG. 10), it is imperative that the various subband signals arrive at their respective decoders 1–4 in proper time synchronism with respect to one another.

Figure 10:
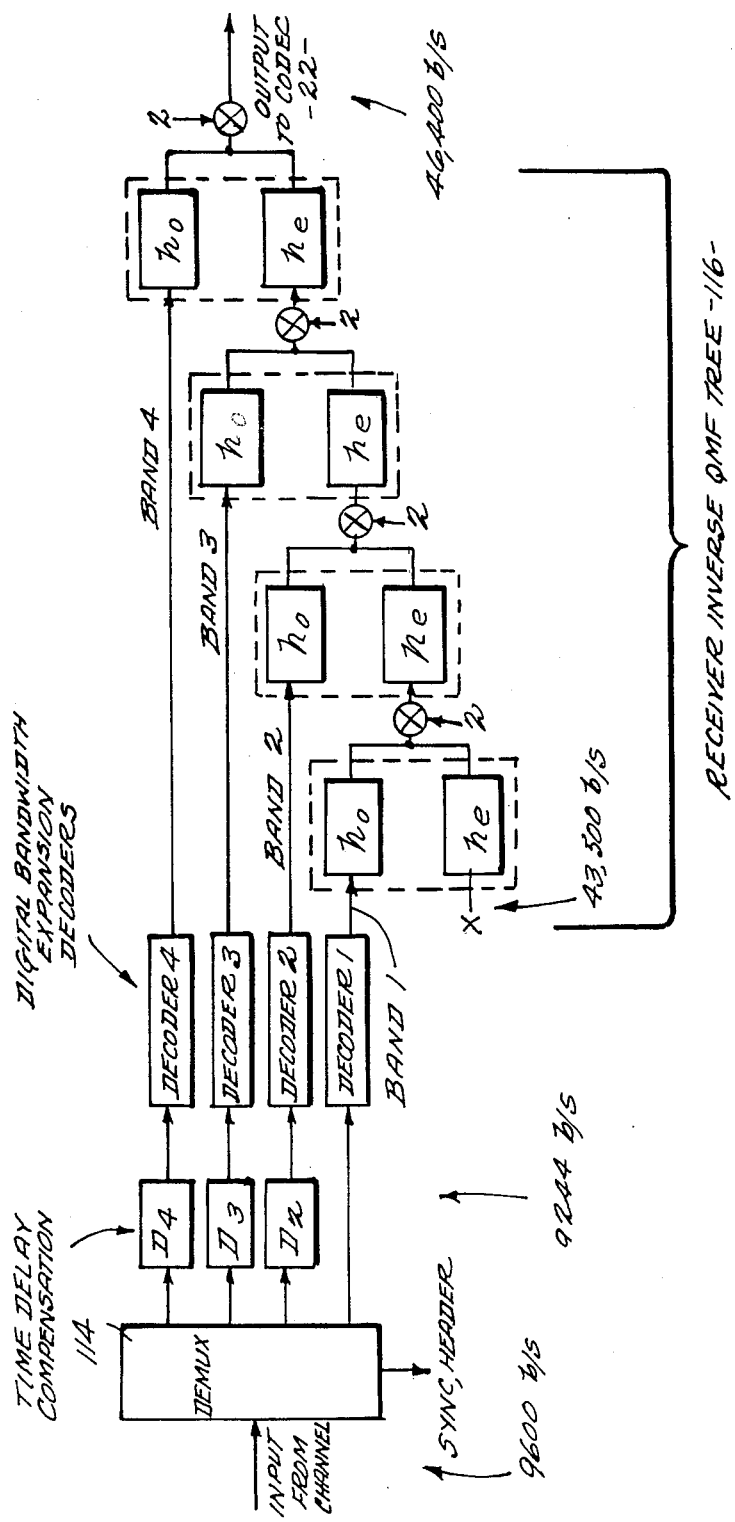
FIG. 10 is a functional block diagram of a time delay compensation process for a subband receiver decoder in accordance with this invention.

In a straightforward elementary implementation of subband coding, simple bandpass filters of the same order (e.g. each introducing the same number of delay stages) may be used in a symmetrical fashion such that all the subband signals remain in time synchronism. This implementation is however cumbersome and inefficient for real time signal processing. A much more efficient approach utilizes the efficient polyphase structures for implementing band splitting quadrature mirror filter trees as shown in FIGS. 8–10. Here, the band splitting function as well as decimation (by virtue of alternate sampling of the filter inputs between the $h_e$, $h_o$ sections) is simultaneously obtained. The implementation is computationally more efficient but unless compensating time delays are introduced into the various subband channels having lesser numbers of filtering steps, then the signals in the various subbands will not be time synchronous. The number of delay stages required will depend on the order of the filters but typically 50 or more delay stages may be required for a four subband coder implementation. If time delay compensation is achieved as in the prior art FIG. 8 manner at a point where the signals have not yet been bandwidth compressed to any great degree, a relatively large number of bits must be stored for the requisite time delays (e.g. $50 \times 16 = 800$ for a 16 bit architecture).

However, using this invention as depicted in FIG. 9, the digital storage required for implementing the time delay compensation is significantly reduced. This is accomplished by performing time delay compensation only after significant digital bandwidth compression has already occurred thus permitting the data to be more efficiently packed into the discrete word lengths of digital memory available in the DSP (or other specialized hardware, if desired). The coders 1–4 provide bandwidth reduction by virtue of simply reducing the number of bits used to represent each sample of the original input signal. These reduced numbers of bits can then be shifted into RAM storage on conventional DSP integrated circuits and thus tightly packed so as to effect a large savings in the memory required for delay equalization.

Although the required time delay compensation might be accomplished entirely during the transmitter functions as depicted in FIG. 9, it might also, or alternatively, be wholly or partially accomplished during implementation of the receiver functions as indicated in FIG. 10. For example, as depicted in FIG. 10, the time delay compensation is again achieved at a point in the signal processing functions where relatively fewer numbers of bits need be stored to effect the desired time delay compensation. In particular, time delay compensation is effected somewhere between the coders 1–4 of the transmitter shown in FIG. 9 and the decoders 1–4 of the receiver shown in FIG. 10.

As should be appreciated, the reconstructed digital output signal stream may be in either bit-serial or bit-parallel (i.e. byte) format as may be required for input to codec 22.

The preferred time sequence of digital signals being transmitted by transmitter 10 or received via receiver 12 is schematically depicted in FIG. 11. This format or time sequence of digital signals is generated for transmission under program control of the microprocessor 14 and, in the receive mode, the control microprocessor 14 is also programmed (e.g. via ROM 30) so as to properly detect and decode the same time sequence or format of digital signals. This unique format permits initial and ongoing frame synchronization, repeater addressing, cryptographic synchronization and selective signalling. All four types of information are repetitively transmitted in a relatively long preamble portion for fade protection (e.g. the usual Raleigh fading which may be expected on radio frequency communication channels) and, in addition, all four types of information are repeatedly retransmitted at regular intervals within the encrypted voice data stream. Fade protecting the preamble by multiple repeats and/or other techniques provides a very high probability of correct initial synchronization and addressing functions. Repeating all four types of information within the voice data stream permits late entry (in the event that the preamble is missed or unsuccessfully decoded) and/or permits recovery of synchronization (in the event that synchronization initially acquired from the preamble is subsequently lost before the end of a given message occurs).

When the transceiver of FIG. 1 is in the "private" mode and the PTT switch is activated, the preamble portion of the format shown in FIG. 11 is first transmitted so as to establish bit synchronization word or frame synchronization, cryptographic synchronization and addressing (e.g. repeater and/or other selective signalling). Fade protection for deep fading (e.g. up to 45 milliseconds) is preferably provided by multiple repeats of a synchronization sequence as well as the initialization vector (IV) and selective signalling (SS) signals.

The initial "dotting" sequence is merely an alternating 1,0 pattern of digital signals (e.g. 10101010 . . . ) and is continued for a "transmitter wake-up time" (e.g. 25 milliseconds). During this initial "dotting" time, the receiver circuits can quickly obtain bit synchronization. For example, conventional hardwired bit synchronization circuits might be utilized in the transmit/receive interface 32 as previously described so as to automatically obtain and remain in bit synchronization with the incoming serial stream of digital signals. Those skilled in the art will appreciate that logic 1's and 0's may be interchanged throughout this discussion since they refer only to two binary levels and not to a rigid voltage polarity or magnitude.

The synchronization sequence next occurs for a time duration equal to the sum of: (a) the maximum expected fade duration, (b) the bit duration required to ensure 99% synchronization acquisition, and (c) the typical time required for repeater turn-on to occur. The exemplary synchronization sequence includes 12 repeats of 48 bit synchronization groups, each of which groups includes a 16 bit synchronization word S (an 11 bit Barker code such as 11100010010 and 5 bits of fill or dotting), an 8 bit "outside address" (OA) repeated once in complemented form (which may alternatively comprise other internal data configurations such as a 5 bit repeater address repeated twice plus filler) to complete a second 16 bit field and a 5 bit sync number (SN) repeated three times (with the second repeat being in complemented form) plus 1 final bit of odd parity code so as to complete the third 16 bit field in a given 48 bit group. At 9600 baud, it requires approximately 60 milliseconds ($(48 \times 12)/9600$) to transmit all 576 bits of the synchronization sequence in the preamble of FIG. 11.

Once a correct synchronization word S is decoded, the following OA and SN fields may be recognized by requiring that all the vectors within each field (2 in the OA field and 3 in the SN field) match (i.e. taking into account the complemented form of adjacent repeated vectors) to ensure proper frame synchronization and/or that sufficiently error free reception is being enjoyed. (Late entry is differentiated from preamble entry by the format of the OA field.) The proper syncronization number SN is reconstructed by voting 2 of 3 on the three 5 bit vector fields. The synchronization number data SN not only helps establish the current or instantaneous position within the synchronization sequence, it also helps ensure that the correct boundary is identified between the sync sequence and the following IV and SS signal sequence as shown in FIG. 11.

The IV and SS fields follow the synchronization sequence in the preamble of FIG. 11. This second control data sequence includes a 64 bit guard band (GB), a 64 bit initialization vector (IV) and a 16 bit selective signalling address (SS) repeated 9 times in the overall IV and SS sequence of 1296 bits depicted in FIG. 11. The 64 bit guard band GB provides fade protection while the 64 bit IV field is used to establish cryptographic synchronization in accordance with the conventional DES. The 16 bit selective signalling field SS provides group and individual selective signalling capability within a radio communication network.

The IV and SS sequence subsists for a time duration equal to the sum of: (a) the time required for transmitting the initialization vector IV, (b) the time required for selective signalling transmissions SS, and (c) the degree of fade protection desired for the SS/IV control data fields. In the exemplary embodiment, approximately 45 milliseconds of fade margin is provided in the IV and SS sequence of 1296 bits.

The selective signalling vector SS may be used for selective calling of individuals or groups using the same DES cryptographic key. Accordingly, truly selective signalling capability is provided within a cryptographic communication network. The 16 bit SS field may represent, for example, a user group with individual addresses therewithin so that users with the same cryptographic key nevertheless have the ability to further subdivide their calls to subsets or individual transceivers within their particular network. For example, the SS field may also be encrypted to facilitate selective signalling within a group of users having the same DES key while providing no information to a user with a different key (or an eavesdropper).

The guard band GB may be used for additional message or signalling capabilities if desired but, in the present exemplary embodiment, it is merely filled with a dotting pattern. 64 bits of dotting was chosen so as to provide a fade margin of approximately 45 milliseconds.

The DES initialization vector IV conventionally contains 64 bits and is a pseudo-randomly generated initialization vector used by the conventional DES encryption algorithm to initialize the cypher-stream generation.

A "five-of-nine" vote is utilized for analyzing the 9 times repeated IV/SS data sequence. For example, at the receiver each of the nine sequential GB/IV/SS data fields is voted bit-by-bit on an at least five-out-of-nine basis. The voted results are stored as used as the correct IV/SS vectors for cryptographic synchronization and selective signalling purposes.

The preamble format of FIG. 11 is chosen so as to provide a 99% probability of correct reception in a radio frequency communication channel experiencing up to about 3% bit error rate (BER). In this analysis, fading is treated as a separate process and dealt with by interleaving redundant data (or left "open" by using all 1's or all 0's, any arbitrary pattern or simply dotted guard bands) along with repeated critical synchronization data as shown in FIG. 11. For example, the FIG. 11 format is designed so as to protect against data losses even though up to about 45 milliseconds of fading may occur on the radio frequency communication channel. The probability of correct reception for the required information is then the product of the probabilities of the individual fields.

Thus if Pch is the probability of the correct preamble reception, then $$Pch = (Pcs * Pcoa * Pcsn) * Pcss * Pciv \quad \text{[Equation 2]}$$

where,

Pcs is the probability of correct sync S reception;
Pcoa is the probability of correct OA reception;
Pcsn is the probability of correct sync number SN reception;
Pcss is the probability of correct selective signalling SS address reception; and
Pciv is the probability of correct initialization vector IV reception.

Assuming a 3% BER and the FIG. 2 format:
(a) for a repeater receiver or a mobile receiver;

$$Pcs * Pcoa * Pcsn = 0.98964 \quad \text{[Equation 3]}$$

(b) for a mobile receiver (the repeater may not require IV and SS);

$$Pcss * Pciv = 0.99978 \quad \text{[Equation 4]}$$

(c) for the repeater, probability of correct acquisition is $$Pcra = 0.98964 \quad \text{[Equation 5]}$$

(d) for a mobile, probability of correct reception of the preamble is $$Pcma = 0.98964 * 0.99978 \quad \text{[Equation 6]}$$

$$Pcma = 0.98845 \quad \text{[Equation 7]}$$

The format of FIG. 11 typically provides:
Initial entry time of about 250 msecs,
Rentry (in case of temporary sync loss)
Late entry capability
Probability of correct detection of the header >99% at a channel BER or 3%
Protection against fades of up to about 50 msecs duration
Falsing rate of less than about once per week.

The output feedback mode of operation of the DES algorithm requires that a 64-bit vector be transmitted every frame period. This vector is different for each transmission thereby constituting 1 out of $2^{64}$ possible vectors. The vector is called an initialization vector or IV.

The reconstructed SS and IV vectors are the result of voting at least 5-of-9 on the available group of 9 vectors as previously described. The process of voting at least 5-out-of-9 on the incoming data stream has the effect of improving the effective bit error rate (BER) of the channel. For a given channel error rate Pe, the probability of correct reception where the probability of correct IV and SS reception.

$$Pcss * Pciv = \left[ \sum_{k=5}^{9} \binom{9}{k} (Pe)^k (1 - Pe)^{9-k} \right]^{80} \quad \text{[Equation 8]}$$

For Pe=0.03 (3% BER), then Pciv*Pcss works out as 0.99978 or 99.98% probability of correct reception.

Correct sync S (11 bit Barker code) reception is ensured by repeating the 11 bits of the Barker code with a 5 bit fill continuously over a finite period. This time was chosen as the sum of the worst case (expected) fade duration and the time taken to repeat the sync pattern so that the probability of correct reception is at least 99% at a 3% BER.

The probability that 27 bits will be correct at a 3% BER, is simply $(1-0.03)^{27}$ or 0.439, i.e. the probability that the sync is corrupted is $(1-0.439)$ or 0.561. Thus the probability that the sync is corrupted n times in a row is $(0.561)^n$ or the probability of correct sync under these conditions is $1-(0.561)^n$. This is required to be at least 0.99 in the exemplary embodiment. The value of n satisfying the above equation is at least 8 (12 is used in the exemplary embodiment and is thus more than ample). The probability of correct sync S and OA is 0.99902.

The probability of correct preamble reception under these conditions is Pch=Pcs * Pcsiv=0.99902 * 0.99*0.99978=0.9899=~0.99.

Following the preamble shown in FIG. 11 are successive data frames, each of which includes a 112 bit header portion and 2040 bits of encrypted voice data. The header includes a single repeat of the sync word S, the outside address OA, the initialization vector IV and the selective signalling address SS. No sync count number SN is provided nor are multiple repeats provided in an attempt to keep the overall data frame length as low as possible (e.g. on the order of 225 milliseconds) and/or to keep the required data processing overhead to a minimum during the time it is necessary to also decode and otherwise process the incoming encrypted voice data.

Nevertheless, by inserting such a header into each data frame, enough information is regularly provided so as to allow for late entry into an ongoing message or conversation and/or so as to reestablish lost frame or cryptographic synchronization (e.g. as might occur from temporary loss of signal or multiple transmitting conditions or the like on a typical radio frequency communication channel). A synchronization maintenance control function in the receiver may thus monitor the ongoing received data frame header. It may permit a certain amount of "free wheeling" even if a bad header is sometimes detected since the critical cryptographic initialization vector IV can be predicted from the previously received (correct) IV. Once cryptographic synchronization has been completely lost, the preferred exemplary embodiment requires two valid received IV's (in consecutive data frames) to be detected before proper cryptographic synchronization is resumed.

As also depicted in FIG. 11, an end of message (EOM) signal is transmitted at the end of a message transmission (e.g. upon release of the PTT switch 20). The EOM signal is continued for about 50 milliseconds in the exemplary embodiment so as to allow for relatively long fades in the received signal while still ensuring that the EOM is properly decoded.

In the format of FIG. 11, the sync word S should preferably precede the other associated fields (e.g. OA, IV, SS) so as to permit frame sync acquisition before the other fields are to be detected. However, the exact order of the remaining OA, IV, SS fields is essentially a matter of choice.

Those skilled in the art should be able to readily devise transmission control programs for the microprocessor 14 required to assemble and transmit data streams in accordance with the time sequences depicted in FIG. 11. However, since the reception processing control is somewhat more involved, an exemplary embodiment of suitable computer program subroutines is presented in FIGS. 12-14 for causing the microprocessor control system of FIG. 1 to properly receive and decode the time sequence of digital signals depicted in FIG. 11.

The receive control functions required by the digital signal format of FIG. 11 may be divided into two major functional computer program subroutines: (a) a synchronization acquisition subroutine as shown in FIG. 12, and (b) a synchronization maintenance subroutine as shown in FIG. 13. A lower level "late entry" subroutine shown in FIG. 14 is utilized in conjunction with the other programs of FIGS. 12 and 13 so as to permit successful late entry into an ongoing conversation.

A repeated hard-wired test is made for presence of the 11 bit Barker code synchronization word S in the transmit/receive interface 32 irrespective of the private/clear mode status thus enabling automatic reception of either DES encoded digital voice or normal analog voice transmissions. Then, whenever decoded voice is present, the control microprocessor 14 itself automatically switches 52 into a "private" receive mode. A suitable visual or other indicator of this automatically derived "private" mode may also be activated by the control microprocessor. (If desired, the transmit portion of switches S1, S2 may also be automatically switched to the "private" mode in readiness for any return transmission.) As will be recalled, the transmit/receive interface 32 of FIG. 1 is preferably hardwired so as to automatically recognize the appropriate Barker code word and to generate an appropriate priority interrupt signal for the microprocessor 14 which then abruptly switches control to entry point 1200 of the sync acquisition subroutine.

Alternatively, the transmit/receive interface 32 may provide a simple multi-bit register through which the incoming bit stream passes and which is periodically sampled by microprocessor 14 at block 1202. If the proper Barker code word is not yet received, then the incoming bit stream may be advanced by one or more bits in the interface buffer at 1204 and another test made for the proper Barker code at 1202. In the preferred exemplary embodiment, the test at 1202 should always simply confirm that a proper Barker code sync word is present -- since that is the condition upon which control is passed to entry point 1200. If not, then the interface 32 is replaced in its sync search mode and control of microprocessor 14 is passed back to higher level programs until the next priority interrupt is produced by interface 32 signifying that another proper sync word S has been detected. As should be appreciated, the interface 32 is preferably wired to inhibit generation of any subsequent priority interrupt until it is again placed in a sync search mode. Otherwise, a priority interrupt would always be generated whenever an incoming S word occurs. It should also be recalled that bit synchronization is typically handled by conventional fixed hardware in the transmit/receive interface 32.

When a correct Barker code synchronization word S has been detected at 1202, control passes to 1206 where a check is made for a proper outside address OA. In other words, is the OA correct for the particular transceiver site in question? If not, then control is passed to wait loop block 1208 where microprocessor 14 now waits for the next sync word S which is tested again at 1202.

If both a valid synchronization word S and valid outside address OA are detected at blocks 1202 and 1206, then a test is made at 1210 to determine whether the S and OA data just received comes from the preamble of FIG. 11 or from a data frame header which, in the latter case, would indicate that a late entry is being attempted to an ongoing message. As explained earlier, the OA field includes two 8-bit vectors. In the preamble, the second vector is the logical complement of the first vector. However, in the data frame header the second vector is merely a straightforward repeat of the first vector.

Accordingly, a test may be made at block 1210 to see whether the second vector in the just received OA field is inverted. If it is, then exit is made to the late entry subroutine of FIG. 14 as indicated. If not, then a normal sync acquisition from the preamble is indicated and control is passed onto block 1212 where a test is made to determine if the synchronization number SN is a valid number (e.g. do the three 5-bit vectors and odd parity code bit check out with respect to one another and, if so, is the indicated sync number less than or equal to 12?). If the sync number SN is not valid, then exit is taken via wait loop 1214 back to block 1202 to wait for the next valid Barker code synchronization word S.

However, if a valid synchronization number SN is detected at 1212, then control is passed to block 1216 where the data field boundaries within the preamble are now established (e.g. because one now knows which one of the 12 repeated S/OA/SN fields has just been successfully detected and where it is located in the interface buffer register). The nine repeated GB/IV/SS fields in the IV and SS sequence of the preamble are then received and a vote is taken among the nine repeats of the IV and SS data fields. In the exemplary embodiment, a simple majority vote (e.g. at least 5 out of 9) is taken on a bit-by-bit basis to determine the final IV and SS field values for later usage by microprocessor 14.

After the voted SS field is available, control is next passed to block 1218 where the SS field is tested to make sure that it is correct for this particular transceiver/site. If not, then exit may be taken via block 1220 where the receiving modem in interface 32 is again placed in the sync search mode where a search is undertaken for the next correct Barker code word.

Finally, if the entire sync acquisition subroutine of FIG. 12 has been successfully completed, then exit from block 1218 will be made to begin actually decoding the data frames which follow so as to drive the receiver audio output circuits. However, since the first portion of each data frame in the exemplary embodiment is a header portion which repeats the S/OA/IV/SS fields, exit from the FIG. 12 subroutine may, if desired, simply be taken to the synchronization maintenance subroutine of FIG. 13 where control of the microprocessor 14 normally resides anyway during the ongoing receipt of a succession of data frames.

Upon entry to the sync maintenance subroutine of FIG. 13 at block 1300, control is passed to block 1302 where the IV and SS fields from the currently received data frame header are read into a buffer register and the just received cryptographic initialization vector IV is compared to the predicted next IV. As will be appreciated by those in the art, the conventional DES algorithm permits one to predict the next IV based upon the previous IV. For the very first data frame, the IV in the header should be the same as the IV already received and voted upon from the preamble. Thus, so as to accommodate the first data frame, an initial housekeeping operation might be performed (e.g. back in the sync acquisition subroutine so as to initially set the predicted next IV to be equal to the voted upon preamble IV).

Additionally, block 1302 may include a test for the end of message character EOM since this would be a convenient place to make such detection. If detected, then the interface 32 may again be placed in the sync search mode and control of microprocessor 14 passed back to higher level programs.

The actual comparison of the currently received IV with the predicted next IV is depicted at block 1304 in FIG. 13. If the two do not match, then an IV loss is indicated and control is passed to block 1306 where a test is made to see if a late entry flag has previously been set (by the late entry subroutine of FIG. 14 to be discussed later). If the late entry flag was set, then exit is taken to block 208 where the current received IV is used to derive a predicted next IV and control is passed back to block 1302.

On the other hand, if the late entry flag was not set, then control is passed from block 1306 to block 1310 where a "loss of IV" counter is incremented. The counter contents is then tested at 1312 to see if it is less than or equal to some desired maximum. In the exemplary embodiment, the maximum may be set at a value up to 10. If the "loss of IV" counter has not yet exceeded the maximum permitted contents, then exit is made to block 1314 where the currently received encrypted voice datafield is decoded using conventional DES algorithms. The decoded results are then conventionally also passed on to codec 22 which drives the analog receiver audio output circuits as should now be appreciated by those in the art and control is passed back to block 1302 of the sync maintenance subroutine for processing the next data frame of the incoming message.

If the "loss of IV" counter exceeds the maximum permitted value as tested at block 1312, then this indicates a loss of sync and, as a result, the interface 32 is again placed in its sync search mode and control is passed back to higher level programs as indicated by block 1316.

Under normal circumstances, when there is no IV loss as tested at block 1304, then control is passed to block 1318 where a test is made on the late entry flag. If the late entry flag has not been set, then control is passed directly to block 1320 where the "loss of IV" counter is cleared (just in case it might have previously accumulated some content) and control is passed onto block 1314 where the encrypted voice data field is decoded, etc. as previously described. On the other hand, if the late entry flag was set as tested at block 1318, then the late entry flag is reset at block 1322 so as to indicate a good late entry sync acquisition. As should now be appreciated, during normal message reception times, control of microprocessor 14 repeatedly passes about the loop comprising blocks 1302, 304, 1318, 1320 and 1314.

If exit is made to the late entry subroutine from block 1310 of FIG. 12, then control is passed to block 1400 of FIG. 14 where the IV and SS fields are decoded and stored from the currently received data frame header. A test is made at 1402 to see if the SS field is correct for this particular transceiver/site. If not, then the interface 32 is again placed in its sync search mode and control is passed back to higher level programs as indicated by block 1404.

On the other hand, if the SS field is detected as being correct at block 1402, then the late entry flag is set at block 1406 and the next initialization vector IV will then be iteratively predicted at block 1408 in accordance with conventional DES algorithms and a wait loop maintained until the next data frame time whereupon a return is made to the entry of the sync maintenance subroutine in FIG. 13.

To summarize the control algorithm represented by the flowcharts of FIGS. 12-14, initial sync acquisition involves acquisition of the 11-bit Barker code to establish word synchronization. The hardwired interface circuits 32 detect the Barker code word and priority interrupt the microprocessor 14 whereupon control passes to the sync acquisition subroutine of FIG. 12. The repeater address or outside address field OA and the other following fields are then subsequently acquired and temporarily held in a suitable buffer storage. The information thus held in the buffer will have a unique characteristic identifying it as having come from the preamble or from the header of a regular data frame. In the exemplary embodiment, such differentiation is provided by causing the second or repeated vector in the outside address OA field to be inverted in the preamble but not inverted in the header of a regular data field. Thus, a test can be made at block 1210 of FIG. 12 to determine whether the incoming S and OA fields originated from a preamble or from the header of a data frame.

If sync acquisition is made during the preamble (as should normally occur), the next occurring 16-bit SN field is grouped into three 5-bit fields and a single odd parity bit field. In the exemplary embodiment, the second 5-bit vector is inverted but otherwise the three 5-bit vectors should match if correctly received and the value of the 5-bit vector identifies which one of the 12 repeated synchronization packets (i.e. S/OA/SN) has just been successfully received. This permits the correct boundary to be established between the 576-bit sync sequence and the 1296-bit IV/SS sequence of the preamble. Once this boundary has been established, then the 9-way redundant GB/IV/SS data stream may be properly framed, received and a majority vote process performed so as to provide a degree of error correction in the resultant initially received IV and SS data fields. The error corrected SS address is then checked for proper identification and, if correct, then the error corrected IV may be used for DES decryption of the encrypted voice data field.

On the other hand, if successful sync acquisition is not made during receipt of a preamble to a message, then a "late entry" situation is indicated. This may occur, for example, because the receiver was somehow "late" in acquiring synchronization either by missing the preamble altogether or by having temporarily lost sufficient RF signal due to a long fade situation in a RF communication channel. In such case, the fields following the OA of the data frame header are the IV and SS fields. If the SS field correctly checks out (i.e. indicating that the message is indeed intended for this particular receiver), then a late entry flag is set and the incoming IV data from the data frame header is stored. This first received IV from a data frame header is not used immediately for voice data decryption but, rather, is used only to predict the IV for the next frame. Thus, a wait is made for the next frame where entry to the sync maintenance subroutine provides the IV received from the next data frame.

If the late entry flag is set, and the predicted and currently received IV's do not match, then the current IV is merely used as the "seed" for the next predicted IV to be used in the sync maintenance subroutine while continuing to inhibit the audio output. Accordingly, in the case of a late entry, two successive correctly received IV's are required before audio output is permitted to occur.

During sync maintenance (for either type of sync acquisition) the just received incoming IV stream is compared to the predicted new IV internally generated in accordance with the DES algorithm. If the late entry flag was set and a good IV comparison is made, then the sync loss counter is cleared and the correct IV may be used to generate a DES decryption vector (e.g. using the DES key from memory 28) in accordance with conventional DES algorithms.

During steady state, the receiver continues to decrypt the encrypted voice stream. Furthermore, if during steady state operation the predicted IV does not properly compare with the currently received IV, a sync loss counter is incremented and when the value exceeds a maximum (e.g. 10), the receiver is assumed to have dropped out of synchronization and attempts are then made to resynchronize the receiver with the incoming data stream. Accordingly, in the exemplary embodiment, once a steady state operation has been achieved, the receiver can "coast" for about 10 data frames (e.g. about 2.25 seconds) before synchronization is considered to have been completely lost.

Although only one exemplary embodiment o this invention has been described in a detail, those skilled in the art will recognize that there are many possible modifications and variations which may be made in the details of this exemplary embodiment while yet retaining many of the novel advantages and features of this invention. Accordingly, all such modifications and variations are intended to be included within the scope of the appended claims.

What is claimed is:

1. In a cryptographic digital signal transceiver including means for processing an input electrical signal having a frequency band of signal components by separating it into plural frequency subbands of signal components which subbands are separately encoded into corresponding binary-valued digital signals that are subsequently combined for transmission over a common digital communication channel, the improvement comprising:

hybrid encoding means which encodes the signal components of at least one of said subbands in accordance with a first predetermined encoding algorithm and which encodes the signal components of at least one other of said subbands in accordance with a different second predetermined encoding algorithm;

time delay means operating in at least one of said subbands to time delay said digital signals in the encoded bit-compressed digital format so as to provide time delay while reducing digital memory requirements for effecting such time delay; and control means for formatting the digital data being transmitted over said common communication channel to include cryptographic synchronization and frame synchronization signals recurrently during an ongoing transmission, said synchronization signals facilitating late entry receipt of the transmitted digital data.

2. An improved cryptographic digital signal transceiver as in claim 1 wherein said hybrid encoding means includes APCM means for effecting adaptive pulse code modulation as said first predetermined encoding algorithm and BCPCM means for effecting block companded pulse code modulation as said second predetermined encoding algorithm.

3. An improved cryptographic digital signal transceiver as in claim 2 comprising means for defining four octave subbands covering an overall frequency band of approximately 180 to 2900 Hz and wherein the highest frequency subband is BCPCM encoded while the three lowest frequency subbands are APCM encoded.

4. An improved cryptographic digital signal transceiver as in claim 1 including:
QMF filter means for separating a digitized input signal into plural subbands of digital signals having different respective time delays therein and representing corresponding subbands of signal frequency components;
said hybrid encoding coding means separately coding the digital signals in each subband in a digitally compressed form to provide compressed coded digital signals in each of said subbands;
said time delay means time delaying said compressed coded digital signals in at least one of said subbands for a predetermined time period to provide substantially time synchronous digital signals at a predetermined point in each of said subbands; and
multiplex means for combining said substantially time synchronous digital signals into an output stream of coded compressed digital signals.

5. An improved cryptographic digital signal transceiver as in claim 1 including:
transmitter and receiver means for transmitting and/or receiving a succession of digital signals; and wherein
said control means is connected to said transmitter and receiver means and includes a digital data microprocessor system programmed so as to perform the following functions:
(a) initial synchronization acquisition wherein said received digital signals are scanned for an initial preamble portion from which frame synchronization, addressing and cryptographic synchronization signals are extracted,
(b) ongoing synchronization maintenance wherein said received digital signals are scanned for data frames succeeding said preamble portion and from which data frames at least said frame synchronization and said cryptographic synchronization signals are repeatedly extracted so as to permit maintenance of such synchronization throughout the decoding of an encrypted message comprising plural such data frames, and
(c) late entry wherein, in the event frame synchronization and/or cryptographic synchronization are lost or not acquired from said preamble, said data frames are scanned and from which synchronization, addressing and cryptographic synchronization signals are nevertheless extracted and control passed back to said ongoing synchronization maintenance function such that the remaining portion of a properly addressed encrypted message data stream is nevertheless successfully decoded.

6. An improved cryptographic digital signal transceiver as in claim 5 wherein said control means is programmed to process said digital signals occurring in substantially the following time sequence.
(A) a preamble portion having:
(1) an alternating 1,0 data pattern,
(2) 12 repeated sets of
(i) a 16 bit synchronization word including a multiple bit Barker code,
(ii) a 16 bit outside address word including a multiple bit address repeated at least once,
(iii) a 16 bit sync number code including a multiple bit number code (identifying which of the 12 repeats is involved) repeated at least once in complemented form and also including at least 1 bit of parity code,
(3) 9 repeated sets of
(i) a 64 bit guard band,
(ii) a 64 bit cryptographic initialization vector,
(iii) a 16 bit selective signalling code identifying the intended message recipient(s),
(B) successive data frames which each include
(1) a 112 bit header portion having
(i) a 16 bit synchronization word including a multiple bit Barker code,
(ii) a 16 bit outside address word including a multiple bit address repeated at least once,
(iii) a 16 bit selective signalling code identifying the intended message recipient(s),
(iv) a 64 bit cryptographic initialization vector,
(v) at least one of the bit fields in the header portion being distinguishable from the respectively corresponding field in the preamble so as to permit detection of a late entry condition,
(2) a 2040 bit string of cryptographically encoded digital data, and
(C) an end-of-message word signifying the end of a given message.

7. A transceiver for sending and receiving digitized and cryptographically encrypted data signals over a communication channel, said transceiver comprising:
receiver means for providing a sequence of received digital signals;
transmitter means for transmitting a sequence of generated digital signals; and
digital signal processing and control means connected to said receiver means and to said transmitter means for processing said received digital signals into audio output and for generating said generated digital signals from audio signals input thereto,
said digital signal processing and control means effecting hybrid subband encoding/decoding of said digital signals by dividing them into plural subbands and by using a different encoding/decoding algorithm in at least one subband than the encoding/decoding algorithm used in at least one other subband; and
wherein both said received and said generated digital signals are formatted to include
(a) an initial preamble portion which includes timing synchronization signals and cryptographic synchronization signals, and
(b) a subsequent sequence of frames of encrypted data also including embedded timing synchronization signals and embedded cryptographic synchronization signals;
said digital signal processing means for to automatically detecting and monitoring said embedded synchronization signals within said received digital signals, maintaining accurate timing and cryptographic synchronization data, and establishing accurate timing and cryptographic synchronization even after occurrence of said preamble portion in the event of belated signal reception or temporary loss of accurate synchronization data during the course of a given received message.

8. A transceiver as in claim 7 wherein said digital signal processing and control means processes digital signals which include addressing signals identifying the desired message recipient both in said initial preamble portion and embedded in said frames of encrypted data, said digital signal processing means also being adapted to automatically detect and monitor said embedded address signals so as to enable belated correctly addressed receipt of a message even after occurrence of said preamble portion in the event of belated signal reception or temporary loss of accurate address data during the course of a given received message.

9. In a subband signal processing method for processing input electrical signals having a frequency band of signal components by separation into plural frequency subbands of signal components which subbands are separately encoded into corresponding binary-valued digital signals that are subsequently combined for transmission over a common digital communication channel, the improvement comprising:
  (a) encoding the signal components of at least one of said subbands in accordance with a first predetermined encoding algorithm and encoding the signal components of at least one other of said subbands in accordance with a different second predetermined encoding algorithm;
  (b) time delaying said digital signals in a bit-compressed encoded digital format in at least one said subband so as to provide time delay while reducing digital memory requirements for effecting such time delay;
  (c) scanning received signals for an initial preamble portion from which frame synchronization, addressing and crypto-graphic synchronization signals are extracted,
  (d) scanning said received digital signals for data frames succeeding said preamble portion and from which data frames at least said frame synchronization and said cryptographic synchronization signals are repeatedly extracted so as to permit maintenance of such synchronization throughout the decoding of an encrypted message comprising plural such data frames, and
  (e) in the event frame synchronization and/or cryptographic synchronization are lost or not acquired from said preamble, scanning said data frames from which synchronization, addressing and crypto-graphic synchronization signals are nevertheless extracted and control is passed back to said ongoing synchronization maintenance function and nevertheless successfully decoding remaining portion of a properly addressed encrypted voice message data stream.

10. A method as in claim 9 wherein said digital signals occur in substantially the following time sequence for a complete message
  (A) a preamble portion having:
    (1) an alternating 1,0 data pattern,
    (2) 12 repeated sets of
      (i) a 16 bit synchronization word including a multiple bit Barker code,
      (ii) a 16 bit outside address word including a multiple bit address repeated at least once in complemented form,
      (iii) a 16 bit sync number code including a multiple bit number code (identifying which of the 12 repeats is involved) repeated at least once and also including at least 1 bit of parity code,
    (3) 9 repeated sets of
      (i) a 64 bit guard band,
      (ii) a 64 bit cryptographic initialization vector,
      (iii) a 16 bit selective signalling code identifying the intended message recipient(s),
  (B) successive data frames which each include
    (1) a 112 bit header portion having
      (i) a 16 bit synchronization word including a multiple bit Barker code,
      (ii) a 16 bit outside address word including a multiple bit address repeated at least once,
      (iii) a 16 bit selective signalling code identifying the intended message recipient(s),
      (iv) a 64 bit cryptographic initialization vector,
      (v) at least one of the bit fields in the header portion being distinguishable from the respectively corresponding field in the preamble so as to permit detection of a late entry condition,
    (2) a 2040 bit string of cryptographically encoded digital data, and
  (C) an end-of-message word signifying the end of a given message.

11. An improved subband signal processing method as in claim 9 wherein adaptive pulse code modulation is used as said first predetermined encoding algorithm and block companded pulse code modulation is used as said second predetermined encoding algorithm.

12. An improved subband signal processing method as in claim 11 wherein four octave subbands covering an overall frequency band of approximately 180 to 2900 Hz are utilized and wherein the highest frequency subband is BCPCM encoded while the three lowest frequency subbands are APCM encoded.

13. A method of sending and receiving digitized and cryptographically encrypted data signals over a communication channel, said method comprising:
  (a) hybrid subband encoding said digital signals into plural frequency subbands wherein the subband signals are digitally band compressed using an encoding/decoding algorithm in at least one channel that is different from the encoding/decoding algorithm used in at least one other of the subbands;
  (b) processing received hybrid subband encoded digital signals into audio output and generating digital signals from locally input audio signals wherein both said received and said generated digital signals are formatted to include
    (1) an initial preamble portion which includes timing synchronization signals and cryptographic synchronization signals, and
    (2) a subsequent sequence of frames of encrypted data also including embedded timing synchronization signals and embedded cryptographic synchronization signals; and
    (3) automatically detecting and monitoring said embedded synchronization signals within said received digital signals so as to maintain accurate timing and cryptographic synchronization data and establishing accurate timing and cryptographic synchronization even after occurrence of said preamble portion in the event of belated signal reception or temporary loss of accurate synchronization data during the course of a given received message.

14. A method as in claim 13 wherein said digital signals include addressing signals identifying the desired message recipient both in said initial preamble portion and embedded in said frames of encrypted data, and automatically detecting and monitoring said embedded address signals so as to enable belated correctly addressed receipt of a message even after occurrence of said preamble portion in the event of belated signal reception or temporary loss of accurate address data during the course of a given received message.

15. A method as in claim 13 further comprising the step of time delaying said digitally band compressed signals in at least one of said subbands so as to reduce the digital memory requirements for effecting such time delay.

16. An arrangement as in claim 1 wherein said time delay means time delay compensates said digital signals in said encoded bit-compressed digital format so as to establish time synchronization of said digital signals in said subbands.

17. A method as in claim 9 wherein said time delaying step includes the step of time delay compensating said digital signals in said encoded bit-compressed digital format so as to establish time synchronization of said digital signals in said subbands.

18. A method as in claim 15 wherein said time delaying step includes the step of time delay compensating said digitally band compressed signals so as to establish time synchronization of said digital signals in said plural subbands.

* * * * *